(12) United States Patent
Erofeev

(10) Patent No.: US 8,489,656 B2
(45) Date of Patent: Jul. 16, 2013

(54) SYSTEMS AND METHODS FOR PERFORMING DATA REPLICATION

(75) Inventor: Andrei Erofeev, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 235 days.

(21) Appl. No.: 13/118,250

(22) Filed: May 27, 2011

(65) Prior Publication Data
US 2011/0295805 A1 Dec. 1, 2011

Related U.S. Application Data

(60) Provisional application No. 61/349,624, filed on May 28, 2010.

(51) Int. Cl.
*G06F 17/30* (2006.01)

(52) U.S. Cl.
USPC ........... 707/828; 707/615; 707/634; 707/692; 707/812

(58) Field of Classification Search
USPC .................. 707/615, 634, 636, 692, 812, 828
See application file for complete search history.

(56) References Cited

U.S. PATENT DOCUMENTS

| | | | |
|---|---|---|---|
| 4,296,465 A | 10/1981 | Lemak | |
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,231,668 A | 7/1993 | Kravitz | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,263,154 A | 11/1993 | Eastridge et al. | |
| 5,265,159 A | 11/1993 | Kung | |

(Continued)

FOREIGN PATENT DOCUMENTS

| | | |
|---|---|---|
| AU | 2006331932 | 12/2006 |
| CA | 2632935 | 12/2006 |

(Continued)

OTHER PUBLICATIONS

U.S. Appl. No. 12/433,238, filed Apr. 30, 2009, Prahlad et al.

(Continued)

*Primary Examiner* — Cheryl Lewis
(74) *Attorney, Agent, or Firm* — Knobbe Martens Olson & Bear, LLP

(57) ABSTRACT

Preparing source data to be replicated in a continuous data replication environment. Certain systems and methods populate a file name database with entries having a unique file identifier descriptor (FID), short name and a FID of the parent directory of each directory or file on a source storage device. Such information is advantageously gathered during scanning of a live file system without requiring a snapshot of the source storage device. The database can be further used to generate absolute file names associated with data operations to be replayed on a destination storage device. Based on the obtained FIDs, certain embodiments can further combine write operations to be replayed on the destination storage device and/or avoid replicating temporary files to the destination system.

17 Claims, 17 Drawing Sheets

U.S. PATENT DOCUMENTS

| | | | |
|---|---|---|---|
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,317,731 A | 5/1994 | Dias et al. |
| 5,321,616 A | 6/1994 | Okuda et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,559,991 A | 9/1996 | Kanfi |
| 5,598,546 A | 1/1997 | Blomgren |
| 5,604,862 A | 2/1997 | Midgely et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,675,511 A | 10/1997 | Prasad et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitsky et al. |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,860,104 A | 1/1999 | Witt et al. |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Steiner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,058,066 A | 5/2000 | Norris et al. |
| 6,061,692 A | 5/2000 | Thomas et al. |
| 6,072,490 A | 6/2000 | Bates et al. |
| 6,076,148 A | 6/2000 | Kedem et al. |
| 6,088,697 A | 7/2000 | Crockett et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,158,044 A | 12/2000 | Tibbetts |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome et al. |
| 6,212,512 B1 | 4/2001 | Barney et al. |
| 6,212,521 B1 | 4/2001 | Minami et al. |
| 6,230,164 B1 | 5/2001 | Rekieta et al. |
| 6,260,068 B1 | 7/2001 | Zalewski et al. |
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,397,308 B1 | 5/2002 | Ofek et al. |
| 6,418,478 B1 | 7/2002 | Ignatius et al. |
| 6,421,711 B1 | 7/2002 | Blumenau et al. |
| 6,434,681 B1 | 8/2002 | Armangau |
| 6,438,595 B1 | 8/2002 | Blumenau et al. |
| 6,466,950 B1 | 10/2002 | Ono |
| 6,473,775 B1 | 10/2002 | Kusters et al. |
| 6,487,561 B1 | 11/2002 | Ofek et al. |
| 6,487,644 B1 | 11/2002 | Huebsch et al. |
| 6,487,645 B1 | 11/2002 | Clark et al. |
| 6,502,205 B1 | 12/2002 | Yanai et al. |
| 6,516,314 B1 | 2/2003 | Birkler et al. |
| 6,516,327 B1 * | 2/2003 | Zondervan et al. .................. 1/1 |
| 6,516,348 B1 | 2/2003 | MacFarlane et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,468 B1 | 4/2003 | Hatakeyama |
| 6,542,909 B1 | 4/2003 | Tamer et al. |
| 6,542,972 B2 | 4/2003 | Ignatius et al. |

| | | |
|---|---|---|
| 6,564,228 B1 | 5/2003 | O'Connor |
| 6,581,143 B2 | 6/2003 | Gagne et al. |
| 6,604,118 B2 | 8/2003 | Kleinman et al. |
| 6,604,149 B1 | 8/2003 | Deo et al. |
| 6,611,849 B1 | 8/2003 | Raff et al. |
| 6,615,223 B1 | 9/2003 | Shih et al. |
| 6,629,189 B1 | 9/2003 | Sandstrom |
| 6,631,477 B1 | 10/2003 | LeCrone et al. |
| 6,631,493 B2 | 10/2003 | Ottesen et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,691,209 B1 | 2/2004 | O'Connell |
| 6,721,767 B2 | 4/2004 | De Meno et al. |
| 6,728,733 B2 | 4/2004 | Tokui |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,472 B1 | 9/2004 | Otterness et al. |
| 6,792,518 B2 | 9/2004 | Armangau et al. |
| 6,799,258 B1 | 9/2004 | Linde |
| 6,820,035 B1 | 11/2004 | Zahavi |
| 6,836,779 B2 | 12/2004 | Poulin |
| 6,839,724 B2 | 1/2005 | Manchanda et al. |
| 6,871,163 B2 | 3/2005 | Hiller et al. |
| 6,871,271 B2 | 3/2005 | Ohran et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,912,482 B2 | 6/2005 | Kaiser |
| 6,925,476 B1 | 8/2005 | Multer et al. |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,952,705 B2 | 10/2005 | Knoblock et al. |
| 6,952,758 B2 | 10/2005 | Chron et al. |
| 6,954,834 B2 | 10/2005 | Slater et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,003,641 B2 | 2/2006 | Prahlad et al. |
| 7,007,046 B2 * | 2/2006 | Manley et al. ............... 707/624 |
| 7,032,131 B2 | 4/2006 | Lubbers et al. |
| 7,035,880 B1 | 4/2006 | Crescenti et al. |
| 7,039,661 B1 | 5/2006 | Ranade |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,068,597 B1 | 6/2006 | Fijolek et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,093,012 B2 | 8/2006 | Olstad et al. |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,106,691 B1 | 9/2006 | Decaluwe et al. |
| 7,107,298 B2 | 9/2006 | Prahlad et al. |
| 7,107,395 B1 | 9/2006 | Ofek et al. |
| 7,111,021 B1 | 9/2006 | Lewis et al. |
| 7,120,757 B2 | 10/2006 | Tsuge |
| 7,130,860 B2 | 10/2006 | Pachet |
| 7,130,970 B2 | 10/2006 | Devassy et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,158,985 B1 | 1/2007 | Liskov |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,203,807 B2 | 4/2007 | Urabe et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,228,456 B2 | 6/2007 | Lecrone et al. |
| 7,231,391 B2 | 6/2007 | Aronoff et al. |
| 7,231,544 B2 | 6/2007 | Tan et al. |
| 7,234,115 B1 | 6/2007 | Sprauve et al. |
| 7,246,140 B2 | 7/2007 | Therrien et al. |
| 7,246,207 B2 | 7/2007 | Kottomtharayil et al. |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Amangau et al. |
| 7,278,142 B2 | 10/2007 | Bandhole et al. |
| 7,284,153 B2 | 10/2007 | Okbay et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |
| 7,318,134 B1 | 1/2008 | Oliveira et al. |
| 7,340,652 B2 | 3/2008 | Jarvis et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,370,232 B2 | 5/2008 | Safford |
| 7,373,364 B1 | 5/2008 | Chapman |
| 7,380,072 B2 | 5/2008 | Kottomtharayil et al. |
| 7,389,311 B1 | 6/2008 | Crescenti et al. |
| 7,392,360 B1 | 6/2008 | Aharoni et al. |
| 7,395,282 B1 | 7/2008 | Crescenti et al. |
| 7,401,064 B1 | 7/2008 | Arone et al. |
| 7,409,509 B2 | 8/2008 | Devassy et al. |
| 7,415,488 B1 | 8/2008 | Muth et al. |
| 7,430,587 B2 | 9/2008 | Malone et al. |
| 7,433,301 B2 | 10/2008 | Akahane et al. |
| 7,440,982 B2 | 10/2008 | Lu et al. |
| 7,454,569 B2 | 11/2008 | Kavuri et al. |
| 7,461,230 B1 | 12/2008 | Gupta et al. |
| 7,467,167 B2 | 12/2008 | Patterson |
| 7,467,267 B1 | 12/2008 | Mayock |
| 7,469,262 B2 | 12/2008 | Baskaran et al. |
| 7,472,238 B1 | 12/2008 | Gokhale |
| 7,472,312 B2 | 12/2008 | Jarvis et al. |
| 7,475,284 B2 | 1/2009 | Koike |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,496,690 B2 | 2/2009 | Beverly et al. |
| 7,500,053 B1 | 3/2009 | Kavuri et al. |
| 7,500,150 B2 | 3/2009 | Sharma et al. |
| 7,502,902 B2 | 3/2009 | Sato |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,519,726 B2 | 4/2009 | Palliyll et al. |
| 7,523,483 B2 | 4/2009 | Dogan |
| 7,529,745 B2 | 5/2009 | Ahluwalia et al. |
| 7,529,748 B2 | 5/2009 | Wen et al. |
| 7,529,782 B2 | 5/2009 | Prahlad et al. |
| 7,532,340 B2 | 5/2009 | Koppich et al. |

| Patent No. | Date | Inventor |
|---|---|---|
| 7,533,181 B2 | 5/2009 | Dawson et al. |
| 7,536,291 B1 | 5/2009 | Retnamma et al. |
| 7,539,707 B2 | 5/2009 | Prahlad et al. |
| 7,539,835 B2 | 5/2009 | Kaiser |
| 7,543,125 B2 | 6/2009 | Gokhale |
| 7,546,324 B2 | 6/2009 | Prahlad et al. |
| 7,546,364 B2 | 6/2009 | Raman et al. |
| 7,565,572 B2 | 7/2009 | Yamasaki |
| 7,581,077 B2 | 8/2009 | Ignatius et al. |
| 7,593,966 B2 | 9/2009 | Therrien et al. |
| 7,596,586 B2 | 9/2009 | Gokhale et al. |
| 7,606,841 B1 | 10/2009 | Ranade |
| 7,606,844 B2 | 10/2009 | Kottomtharayil |
| 7,613,748 B2 | 11/2009 | Brockway et al. |
| 7,613,750 B2 | 11/2009 | Valiyaparambil et al. |
| 7,617,253 B2 | 11/2009 | Prahlad et al. |
| 7,617,262 B2 | 11/2009 | Prahlad et al. |
| 7,617,321 B2 | 11/2009 | Clark |
| 7,617,369 B1 | 11/2009 | Bezbaruah et al. |
| 7,617,541 B2 | 11/2009 | Plotkin et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,668,798 B2 | 2/2010 | Scanlon et al. |
| 7,669,029 B1 | 2/2010 | Mishra et al. |
| 7,685,126 B2 | 3/2010 | Patel et al. |
| 7,689,467 B1 | 3/2010 | Belanger et al. |
| 7,702,533 B2 | 4/2010 | Barnard et al. |
| 7,702,670 B1 | 4/2010 | Duprey et al. |
| 7,707,184 B1 | 4/2010 | Zhang et al. |
| 7,716,171 B2 | 5/2010 | Kryger |
| 7,734,715 B2 | 6/2010 | Hyakutake et al. |
| 7,739,235 B2 | 6/2010 | Rousseau et al. |
| 7,810,067 B2 | 10/2010 | Kaelicke et al. |
| 7,831,553 B2 | 11/2010 | Prahlad et al. |
| 7,831,622 B2 | 11/2010 | Prahlad et al. |
| 7,840,537 B2 | 11/2010 | Gokhale et al. |
| 7,870,355 B2 | 1/2011 | Erofeev |
| 7,904,681 B1 | 3/2011 | Bappe |
| 7,930,476 B1 | 4/2011 | Castelli et al. |
| 7,962,709 B2 | 6/2011 | Agrawal |
| 8,005,795 B2 | 8/2011 | Galipeau et al. |
| 8,024,294 B2 | 9/2011 | Kottomtharayil |
| 8,190,565 B2 | 5/2012 | Prahlad et al. |
| 8,195,623 B2 | 6/2012 | Prahlad et al. |
| 8,271,830 B2 | 9/2012 | Erofeev |
| 8,285,684 B2 | 10/2012 | Prahlad et al. |
| 8,352,422 B2 | 1/2013 | Prahlad et al. |
| 2001/0029512 A1 | 10/2001 | Oshinsky et al. |
| 2001/0029517 A1 | 10/2001 | De Meno et al. |
| 2001/0032172 A1 | 10/2001 | Moulinet et al. |
| 2001/0035866 A1 | 11/2001 | Finger et al. |
| 2001/0042222 A1 | 11/2001 | Kedem et al. |
| 2001/0044807 A1 | 11/2001 | Kleiman et al. |
| 2002/0002557 A1 | 1/2002 | Straube et al. |
| 2002/0004883 A1 | 1/2002 | Nguyen et al. |
| 2002/0019909 A1 | 2/2002 | D'Errico |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0062230 A1 | 5/2002 | Morag et al. |
| 2002/0069324 A1 | 6/2002 | Gerasimov et al. |
| 2002/0083055 A1 | 6/2002 | Pachet et al. |
| 2002/0103848 A1 | 8/2002 | Giacomini et al. |
| 2002/0107877 A1 | 8/2002 | Whiting et al. |
| 2002/0112134 A1 | 8/2002 | Ohran et al. |
| 2002/0120741 A1 | 8/2002 | Webb et al. |
| 2002/0124137 A1 | 9/2002 | Ulrich et al. |
| 2002/0133511 A1 | 9/2002 | Hostetter et al. |
| 2002/0133512 A1 | 9/2002 | Milillo et al. |
| 2002/0161753 A1 | 10/2002 | Inaba et al. |
| 2002/0174107 A1 | 11/2002 | Poulin |
| 2002/0174416 A1 | 11/2002 | Bates et al. |
| 2002/0181395 A1 | 12/2002 | Foster et al. |
| 2003/0005119 A1 | 1/2003 | Mercier et al. |
| 2003/0018657 A1 | 1/2003 | Monday |
| 2003/0023893 A1 | 1/2003 | Lee et al. |
| 2003/0028736 A1 | 2/2003 | Berkowitz et al. |
| 2003/0033308 A1 | 2/2003 | Patel et al. |
| 2003/0061491 A1 | 3/2003 | Jaskiewicz et al. |
| 2003/0079018 A1 | 4/2003 | Lolayekar et al. |
| 2003/0097296 A1 | 5/2003 | Putt |
| 2003/0126200 A1 | 7/2003 | Wolff |
| 2003/0131278 A1 | 7/2003 | Fujibayashi |
| 2003/0135783 A1 | 7/2003 | Martin et al. |
| 2003/0161338 A1 | 8/2003 | Ng et al. |
| 2003/0167380 A1 | 9/2003 | Green et al. |
| 2003/0177149 A1 | 9/2003 | Coombs |
| 2003/0177321 A1 | 9/2003 | Watanabe |
| 2003/0187847 A1 | 10/2003 | Lubbers et al. |
| 2003/0225800 A1 | 12/2003 | Kavuri |
| 2004/0006572 A1 | 1/2004 | Hoshino et al. |
| 2004/0006578 A1 | 1/2004 | Yu |
| 2004/0010487 A1 | 1/2004 | Prahlad et al. |
| 2004/0015468 A1 | 1/2004 | Beier et al. |
| 2004/0039679 A1 | 2/2004 | Norton et al. |
| 2004/0078632 A1 | 4/2004 | Infante et al. |
| 2004/0098425 A1 | 5/2004 | Wiss et al. |
| 2004/0107199 A1 | 6/2004 | Dalrymple et al. |
| 2004/0117438 A1 | 6/2004 | Considine et al. |
| 2004/0117572 A1 | 6/2004 | Welsh et al. |
| 2004/0133634 A1 | 7/2004 | Luke et al. |
| 2004/0139128 A1 | 7/2004 | Becker et al. |
| 2004/0193625 A1 | 9/2004 | Sutoh |
| 2004/0193953 A1 | 9/2004 | Callahan et al. |
| 2004/0205206 A1 | 10/2004 | Naik et al. |
| 2004/0225437 A1 | 11/2004 | Endo et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267777 A1* | 12/2004 | Sugimura et al. ............ 707/100 |
| 2004/0267835 A1 | 12/2004 | Zwilling et al. |
| 2004/0267836 A1 | 12/2004 | Armangau et al. |
| 2005/0027892 A1 | 2/2005 | McCabe et al. |
| 2005/0033800 A1 | 2/2005 | Kavuri et al. |
| 2005/0044114 A1 | 2/2005 | Kottomtharayil et al. |
| 2005/0060613 A1 | 3/2005 | Cheng |
| 2005/0080928 A1 | 4/2005 | Beverly et al. |
| 2005/0086443 A1 | 4/2005 | Mizuno et al. |
| 2005/0108292 A1 | 5/2005 | Burton et al. |
| 2005/0114406 A1 | 5/2005 | Borthakur et al. |
| 2005/0131900 A1 | 6/2005 | Palliyll et al. |
| 2005/0138306 A1 | 6/2005 | Panchbudhe et al. |
| 2005/0144202 A1 | 6/2005 | Chen |
| 2005/0172073 A1 | 8/2005 | Voigt |
| 2005/0187982 A1 | 8/2005 | Sato |
| 2005/0187992 A1 | 8/2005 | Prahlad et al. |
| 2005/0188109 A1 | 8/2005 | Shiga et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0228875 A1 | 10/2005 | Monitzer et al. |
| 2005/0246376 A1 | 11/2005 | Lu et al. |
| 2005/0246510 A1 | 11/2005 | Retnamma et al. |
| 2005/0254456 A1 | 11/2005 | Sakai |
| 2005/0268068 A1 | 12/2005 | Ignatius et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0010341 A1 | 1/2006 | Kodama |
| 2006/0020616 A1 | 1/2006 | Hardy et al. |
| 2006/0034454 A1 | 2/2006 | Damgaard et al. |
| 2006/0047805 A1 | 3/2006 | Byrd et al. |
| 2006/0047931 A1 | 3/2006 | Saika |
| 2006/0092861 A1 | 5/2006 | Corday et al. |
| 2006/0107089 A1 | 5/2006 | Jansz et al. |
| 2006/0120401 A1 | 6/2006 | Harada et al. |
| 2006/0129537 A1 | 6/2006 | Torii et al. |
| 2006/0136685 A1 | 6/2006 | Griv et al. |

| | | |
|---|---|---|
| 2006/0155946 A1 | 7/2006 | Ji |
| 2006/0171315 A1 | 8/2006 | Choi et al. |
| 2006/0174075 A1 | 8/2006 | Sutoh |
| 2006/0215564 A1 | 9/2006 | Breitgand et al. |
| 2006/0230244 A1 | 10/2006 | Amarendran et al. |
| 2006/0242371 A1 | 10/2006 | Shono et al. |
| 2006/0242489 A1 | 10/2006 | Brockway et al. |
| 2007/0033437 A1 | 2/2007 | Kawamura |
| 2007/0043956 A1 | 2/2007 | El Far et al. |
| 2007/0050547 A1 | 3/2007 | Sano |
| 2007/0055737 A1 | 3/2007 | Yamashita et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0124347 A1 | 5/2007 | Vivian et al. |
| 2007/0124348 A1 | 5/2007 | Claborn et al. |
| 2007/0130373 A1 | 6/2007 | Kalwitz |
| 2007/0143371 A1 | 6/2007 | Kottomtharayil |
| 2007/0143756 A1 | 6/2007 | Gokhale |
| 2007/0179990 A1 | 8/2007 | Zimran et al. |
| 2007/0183224 A1 | 8/2007 | Erofeev |
| 2007/0185852 A1 | 8/2007 | Erofeev |
| 2007/0185937 A1 | 8/2007 | Prahlad et al. |
| 2007/0185938 A1 | 8/2007 | Prahlad et al. |
| 2007/0185939 A1 | 8/2007 | Prahland et al. |
| 2007/0185940 A1 | 8/2007 | Prahlad et al. |
| 2007/0186042 A1 | 8/2007 | Kottomtharayil et al. |
| 2007/0186068 A1 | 8/2007 | Agrawal |
| 2007/0198602 A1 | 8/2007 | Ngo et al. |
| 2007/0226438 A1 | 9/2007 | Erofeev |
| 2007/0244571 A1 | 10/2007 | Wilson et al. |
| 2007/0260609 A1 | 11/2007 | Tulyani |
| 2007/0276848 A1* | 11/2007 | Kim ............................ 707/100 |
| 2007/0288536 A1 | 12/2007 | Sen et al. |
| 2008/0016126 A1 | 1/2008 | Kottomtharayil et al. |
| 2008/0016293 A1 | 1/2008 | Saika |
| 2008/0028009 A1 | 1/2008 | Ngo |
| 2008/0059515 A1 | 3/2008 | Fulton |
| 2008/0077634 A1 | 3/2008 | Quakenbush |
| 2008/0103916 A1 | 5/2008 | Camarador et al. |
| 2008/0104357 A1 | 5/2008 | Kim et al. |
| 2008/0114815 A1 | 5/2008 | Sutoh |
| 2008/0147878 A1 | 6/2008 | Kottomtharayil et al. |
| 2008/0183775 A1 | 7/2008 | Prahlad et al. |
| 2008/0205301 A1 | 8/2008 | Burton et al. |
| 2008/0228987 A1 | 9/2008 | Yagi |
| 2008/0229037 A1 | 9/2008 | Bunte et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0244177 A1 | 10/2008 | Crescenti et al. |
| 2008/0250178 A1 | 10/2008 | Haustein et al. |
| 2008/0306954 A1 | 12/2008 | Hornqvist |
| 2008/0313497 A1 | 12/2008 | Hirakawa |
| 2009/0013014 A1 | 1/2009 | Kern |
| 2009/0044046 A1 | 2/2009 | Yamasaki |
| 2009/0113056 A1 | 4/2009 | Tameshige et al. |
| 2009/0150462 A1 | 6/2009 | McClanahan et al. |
| 2009/0182963 A1 | 7/2009 | Prahlad et al. |
| 2009/0187944 A1 | 7/2009 | White et al. |
| 2009/0319534 A1 | 12/2009 | Gokhale |
| 2009/0319585 A1 | 12/2009 | Gokhale |
| 2010/0005259 A1 | 1/2010 | Prahlad |
| 2010/0049753 A1 | 2/2010 | Prahlad et al. |
| 2010/0094808 A1 | 4/2010 | Erofeev |
| 2010/0100529 A1 | 4/2010 | Erofeev |
| 2010/0122053 A1 | 5/2010 | Prahlad et al. |
| 2010/0131461 A1 | 5/2010 | Prahlad et al. |
| 2010/0131467 A1 | 5/2010 | Prahlad et al. |
| 2010/0145909 A1 | 6/2010 | Ngo |
| 2010/0153338 A1 | 6/2010 | Ngo et al. |
| 2010/0179941 A1 | 7/2010 | Agrawal et al. |
| 2010/0205150 A1 | 8/2010 | Prahlad et al. |
| 2010/0211571 A1 | 8/2010 | Prahlad et al. |
| 2011/0066599 A1 | 3/2011 | Prahlad et al. |
| 2011/0238621 A1 | 9/2011 | Agrawal |
| 2011/0246416 A1 | 10/2011 | Prahlad et al. |
| 2011/0246429 A1 | 10/2011 | Prahlad et al. |
| 2012/0030171 A1 | 2/2012 | Kottomtharayil |
| 2012/0317074 A1 | 12/2012 | Ngo |
| 2013/0006926 A1 | 1/2013 | Erofeev |
| 2013/0006938 A1 | 1/2013 | Prahlad et al. |
| 2013/0006942 A1 | 1/2013 | Prahlad et al. |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| EP | 1974296 | 10/2008 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 200347811 | 12/2000 |
| WO | WO 93/03549 | 2/1993 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 02/095632 | 11/2002 |
| WO | WO 03/028183 | 4/2003 |
| WO | WO 2004/034197 | 4/2004 |
| WO | WO 2005/055093 | 6/2005 |
| WO | WO 2005/086032 | 9/2005 |
| WO | WO 2007/053314 | 5/2007 |
| WO | WO 2007/075587 | 7/2007 |
| WO | WO 2010/068570 | 6/2010 |

OTHER PUBLICATIONS

Armstead et al., "Implementation of a Campus-Wide Distributed Mass Storage Service: The Dream vs. Reality," IEEE, 1995, pp. 190-199.

Arneson, "Development of Omniserver; Mass Storage Systems," Control Data Corporation, 1990, pp. 88-93.

Arneson, "Mass Storage Archiving in Network Environments" IEEE, 1998, pp. 45-50.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Cabrera, et al., "ADSM: A Multi-Platform, Scalable, Back-up and Archive Mass Storage System," Digest of Papers, Compcon '95, Proceedings of the 40th IEEE Computer Society International Conference, Mar. 5-9, 1995, pp. 420-427, San Francisco, CA.

Canadian Office Action dated Dec. 29, 2010, Application No. CA2546304.

Eitel, "Backup and Storage Management in Distributed Heterogeneous Environments," IEEE, 1994, pp. 124-126.

European Examination Report, Application No. 06848901.2, Apr. 1, 2009, pp. 7.

Examiner's First Report ; Application No. 2006331932 May 11, 2011 in 2 pages.

Examiner's Report for Australian Applicaiton No. 2003279847, Dated Dec. 9, 2008, 4 pages.

Final Office Action for Japanese Application No. 2003531581, Mail Date Mar. 24, 2009, 6 pages.

First Office Action for Japanese Application No. 2003531581, Mail Date Jul. 8, 2008, 8 pages.

Gait, "The Optical File Cabinet: A Random-Access File system for Write-Once Optical Disks," IEEE Computer, vol. 21, No. 6, pp. 11-22 (1988).

Gray, et al. "Transaction processing: concepts and techniques" 1994, Morgan Kaufmann Publishers, USA, pp. 604-609, 646-655.

Harrington, Lisa H., "The RFP Process: How to Hire a Third Party", Transportation & Distribution, Sep. 1988, vol. 39, Issue 9, in 5 pages. http://en.wikipedia.org/wiki/Naive_Bayes_classifier, printed on Jun. 1, 2010, in 7 pages.

International Preliminary Report on Patentability, PCT Application No. PCT/US2009/066880, mailed Jun. 23, 2011, in 9 pages.

International Search Report and Written Opinion dated Jan. 11, 2006, PCT/US2004/038455.

International Search Report and Written Opinion dated Mar. 25, 2010, PCT/US2009/066880.

International Search Report and Written Opinion dated Nov. 13, 2009, PCT/US2007/081681.

International Search Report and Written Opinion issued in PCT Application No. PCT/US2011/030396, mailed Jul. 18, 2011, in 20 pages.

International Search Report and Written Opinion issued in PCT Application No. PCT/US2011/38436, mailed Sep. 21, 2011, in 18 pages.

International Search Report dated Dec. 28, 2009, PCT/US2004/038324.

International Search Report dated May 15, 2007, PCT/US2006/048273.

Jander, "Launching Storage-Area Net," Data Communications, US, McGraw Hill, NY, vol. 27, No. 4(Mar. 21, 1998), pp. 64-72.

Kashyap, et al., "Professional Services Automation: A knowledge Mangement approach using LSI and Domain specific Ontologies", FLAIRS-01 Proceedings, 2001, pp. 300-302.

Lyon J., Design considerations in replicated database systems for disaster protection, COMPCON 1988, Feb. 29, 1988, pp. 428-430.

Microsoft Corporation, "Microsoft Exchange Server: Best Practices for Exchange Database Management," 1998.

Rosenblum et al., "The Design and Implementation of a Log-Structure File System," Operating Systems Review SIGOPS, vol. 25, No. 5, New York, US, pp. 1-15 (May 1991).

Second Examination Report in EU Appl. No. 06 848 901.2-2201 dated Dec. 3, 2010.

The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009.

Veritas Software Corporation, "Veritas Volume Manager 3.2, Administrator's Guide," Aug. 2001, 360 pages.

Wiesmann M, Database replication techniques: a three parameter classification, Oct. 16, 2000, pp. 206-215.

Arneson, David A., Control Data Corporation, Development of Omniserver; Mass Storage Systems, 1990, pp. 88-93.

Calvert, Andrew, "SQL Server 2005 Snapshots", published Apr. 3, 2006, http:/www.simple-talk.com/contnet/print.aspx?article=137, 6 pages.

Final Office Action for U.S. Appl. No. 12/407,906, mail date Jul. 11, 2011, 38 pages.

Notice of Allowance in U.S. Appl. No. 13/235,292 mailed Feb. 6, 2013.

Canadian Office Action dated Sep. 24, 2012, Application No. 2,632,935, 2 pages.

First Office Action in Canadian application No. 2,632,935 dated Feb. 16, 2012, in 5 pages.

Office Action in U.S. Appl. No. 13/523,709 mailed Dec. 5, 2012.

International Search Report and Written Opinion issued on PCT Application No. PCT/US2011/030396, mailed Jul. 18, 2011, in 20 pages.

International Preliminary Report on Patentability and Written Opinion in PCT/US2011/030396 mailed Oct. 2, 2012.

International Preliminary Report on Patentability and Written Opinion in PCT/US2011/038436 mailed Dec. 4, 2012.

International Search Report dated Dec. 28, 2009, PCT/US204/038324.

* cited by examiner

SYSTEMS AND METHODS FOR PERFORMING DATA REPLICATION

CROSS-REFERENCE TO RELATED APPLICATION

This application claims the benefit of priority under 35 U.S.C. §119(e) of U.S. Provisional Patent Application No. 61/349,624, filed on May 28, 2010, and entitled "SYSTEMS AND METHODS FOR PERFORMING DATA REPLICATION," the disclosure of which is hereby incorporated by reference in its entirety.

BACKGROUND

1. Field

The present disclosure relates to performing copy and/or data management operations in a computer network and, in particular, to systems and methods for performing data replication in a storage management system.

2. Description of the Related Art

Computers have become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of information that is both accurate and current. Accordingly, businesses worldwide recognize the commercial value of their data and seek reliable, cost-effective ways to protect the information stored on their computer networks.

To address the need to maintain current copies of electronic information, certain data replication systems have been provided to "continuously" copy data from one or more source machines to one or more destination machines. These continuous data replication (CDR) systems provide several advantages for disaster recovery solutions and can substantially reduce the amount of data that is lost during an unanticipated system failure.

One drawback of such CDR systems is that, during an initial synchronization phase, many systems record absolute file names when scanning a source storage device in order to replicate the scanned data to a same location on a destination storage device. Moreover, this scanning is generally performed while the source file system is in a fixed state, such as based on a snapshot of the file system.

SUMMARY

In view of the foregoing, a need exists for improved systems and methods for preparing and transmitting source data to be replicated to a destination system. For instance, there is a need for systems and methods for scanning a live file system during an initial synchronization phase between the source and destination systems.

Certain embodiments of the invention are provided for intelligent data replication. In particular, embodiments of the invention include improved systems and methods scanning a source file system having data to be copied in a CDR system. In certain embodiments, such scanning is performed on a live file system without requiring a snapshot of the file system data. For example, file identifier descriptors (FIDs), which are generally not exposed to outside the kernel, of files and/or directories on the file system can be used to populate a file name database usable to construct an absolute file name when transmitting data to a replication system.

In certain further embodiments, use of FIDs to track files on the source system and/or an introduction of a slight delay in the replication process allows for more efficient data replication operations. For instance, journal entries representing monitored data operations on the source file system can be stored without storing the actual data. Moreover, location information in the log entries can be analyzed to determine if multiple write operations on the source system can be combined into a single write operation on the destination system. In yet other embodiments, temporary files on the source system can be identified and not copied to the destination system.

According to certain embodiments, a method is provided for identifying data to be copied in a data replication system. The method can include obtaining with a scanning module executing on a computing device a first file identifier descriptor (FID) of a first directory on a live source file system. In some cases, the first FID is one of a plurality of unique identifiers corresponding to a plurality of directories and files on the source file system. The method may further include adding the first FID to a queue, and can also include storing a current journal sequence number from a file system filter driver identifying a first time. In some instances, the method includes, following said storing, accessing a current directory of the plurality of directories on the source file system that corresponds to a next FID stored in the queue. The method can additional include obtaining additional FIDs for each immediate child directory and immediate child file in the current directory. If no changes have been made to the current directory since the first time, the method can include: populating a file name database with the additional FIDs of each immediate child directory and immediate child file in the current directory; adding the additional FIDs of each immediate child directory of the current directory to the queue; and/or removing the next FID from the queue. If changes have been made to the first directory since the first time, the method can include repeating said storing, said accessing and said obtaining the additional FIDs.

In some embodiments, a system is provided for preparing data for replication from a source computing device in a network. The may include a queue configured to store a plurality of file identifier descriptors (FIDs) each comprising a unique identifier that corresponds to one of a plurality of directories and files on a source file system. The system can also include a scanning module executing on a computing device and configured to scan the source file system while in a live state and to populate the queue with the plurality of FIDs. In certain cases, the system additionally includes a database comprising file name data that associates each of the plurality of FIDs with a short name and a parent FID. The scanning module can be further configured to populate the database with the file name data based on said scan of the source file system in the live state. The system can also include at least one database thread configured to receive a data entry identifying a data management operation associated with at least one of the plurality of directories and files on the source file system and to construct from the FID associated with the at least one directory or file an absolute file name for transmission to a destination system along with a copy of the data management operation for replying on the destination system.

According to other aspects of the disclosure, a method is provided for performing data replication. The method can include monitoring a plurality of journal entries associated with writing data to a source storage device. The method may further include identifying a first journal entry of the plurality of journal entries. The first journal entry may comprise a first data write operation, a first file identifier descriptor (FID) of a file to be modified by the first data write operation on the source storage device, and a first location of a first portion of the file to be modified. The method can also include identifying a second journal entry of the plurality of journal entries, the second journal entry comprising a second data write operation, a second FID of a file to be modified by the second data write operation on the source storage device, and a second location of a second portion of the file to be modified. In some instances, the method additionally includes determining that the first and second data write operations can be combined into a single write operation. The method may also include constructing an absolute file name based on at least one of said first and second FIDs, wherein neither the first nor second journal entries comprises the absolute file name. In some embodiments, the method includes transmitting the single write operation and the absolute file name to a destination storage device to replay on the destination storage device the data modifications associated with the first and second write operations.

According to yet further aspects of the disclosure, a system is provided for performing data replication. The system can include at least one computer application executing on a computing device and configured to generate operations associated with data on a source storage device. The system may also include a filter module disposed between the at least one computer application and the first storage device. The filter module can be configured to identify from the operations, a first data modification operation, a first file identifier descriptor (FID) of a file to be modified by the first data modification operation, and a first location of a first portion of the file to be modified, and a second data modification operation, a second FID of a file to be modified by the second data modification operation, and a second location of a second portion of the file to be modified. The system can further include a processing module configured to determine that the first and second data modification operations can be combined into a single modification operation. In some embodiments, the system also includes at least one database thread configured to construct an absolute file name for replaying the single modification operation on replication data of a destination storage device based on at least one of said first and second FIDs. In some cases, neither the first nor second data modification operations comprises the absolute file name.

According to other embodiments, a system is provided for performing data replication. The system can include means for monitoring a plurality of journal entries associated with writing data to a source storage device. The system can further include means for identifying a first journal entry of the plurality of journal entries, the first journal entry comprising a first data write operation, a first file identifier descriptor (FID) of a file to be modified on the source storage device, and a first location of a first portion of the file to be modified, and for identifying a second journal entry of the plurality of journal entries, the second journal entry comprising a second data write operation, a second FID of a file to be modified on the source storage device, and a second location of a second portion of the file to be modified. The system can also include means for determining that the first and second data write operations can be combined into a single write operation. In certain embodiments, the system further includes means for constructing an absolute file name based on at least one of said first and second FIDs, wherein neither the first nor second journal entries comprises the absolute file name. The system may additionally include means for transmitting the single write operation and the absolute file name to a destination storage device to replay on the destination storage device the data modifications associated with the first and second write operations.

According to additional aspects, a method is provided for performing data replication. The method can include monitoring data operations associated with an application executing on a computing device, the data operations operative to write data to a first storage device. The method can also include populating a log file with a plurality of data entries indicative of the data operations. In some cases, the method includes identifying a first one of the plurality of data entries associated with writing data to a temporary file on the first storage device. The method may additionally include replaying to a second storage device, based on a portion of the data entries, a portion of the data operations to replicate data to a first location on the second storage device. The portion of the data entries according to some embodiments does not include the first one of the plurality of data entries.

According to some aspects of the disclosure, a system is provided for performing data replication between two computing devices in a network. The system can include at least one computer application executing on a first computing device and configured to generate a plurality of operations associated with storing data on a source storage device, the data comprising at least one temporary file and at least one non-transitory file. The system may also include a log file comprising a plurality of data entries indicative of the plurality of operations. In some cases, a first one of the plurality of data entries is associated with writing the at least one temporary file. According to some embodiments, the system includes a processing module executing on and configured to identify a first one of the plurality of data entries associated with writing the temporary file. The processing module may be further configured to copy a portion of the entries of the log file to a second computing device in network communication with the first computing device. The portion of the data entries according to some embodiments does not include the first one of the plurality of data entries.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

As will be seen from the disclosure herein, certain embodiments of systems and methods are provided for intelligent data replication. In particular, embodiments of the invention include improved systems and methods for scanning a source file system having data to be copied in a CDR system. In certain embodiments, such scanning is performed on a live file system without requiring a snapshot of the file system data. For example, FIDs of files and/or directories on the file system can be used to populate a file name database usable to construct an absolute file name when transmitting data to the replication system.

In certain further embodiments, use of FIDs to track files on the source system and/or accumulating a group of journal entries to transmit during the replication process allows for more efficient data replication operations. For instance, logs with entries representing monitored data operations on the source file system can be stored without actual data. Moreover, location information in the log entries can be analyzed to determine if multiple write operations on the source system can be combined into a single write operation on the destination system. In yet other embodiments, temporary files on the source system can be passed over when identifying source data to be copied to the destination system.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

Moreover, embodiments of the invention can be used in combination with replication systems and methods described in U.S. Pat. No. 7,651,593, which is hereby incorporated herein in its entirety to be considered part of this specification.

Figure 1:
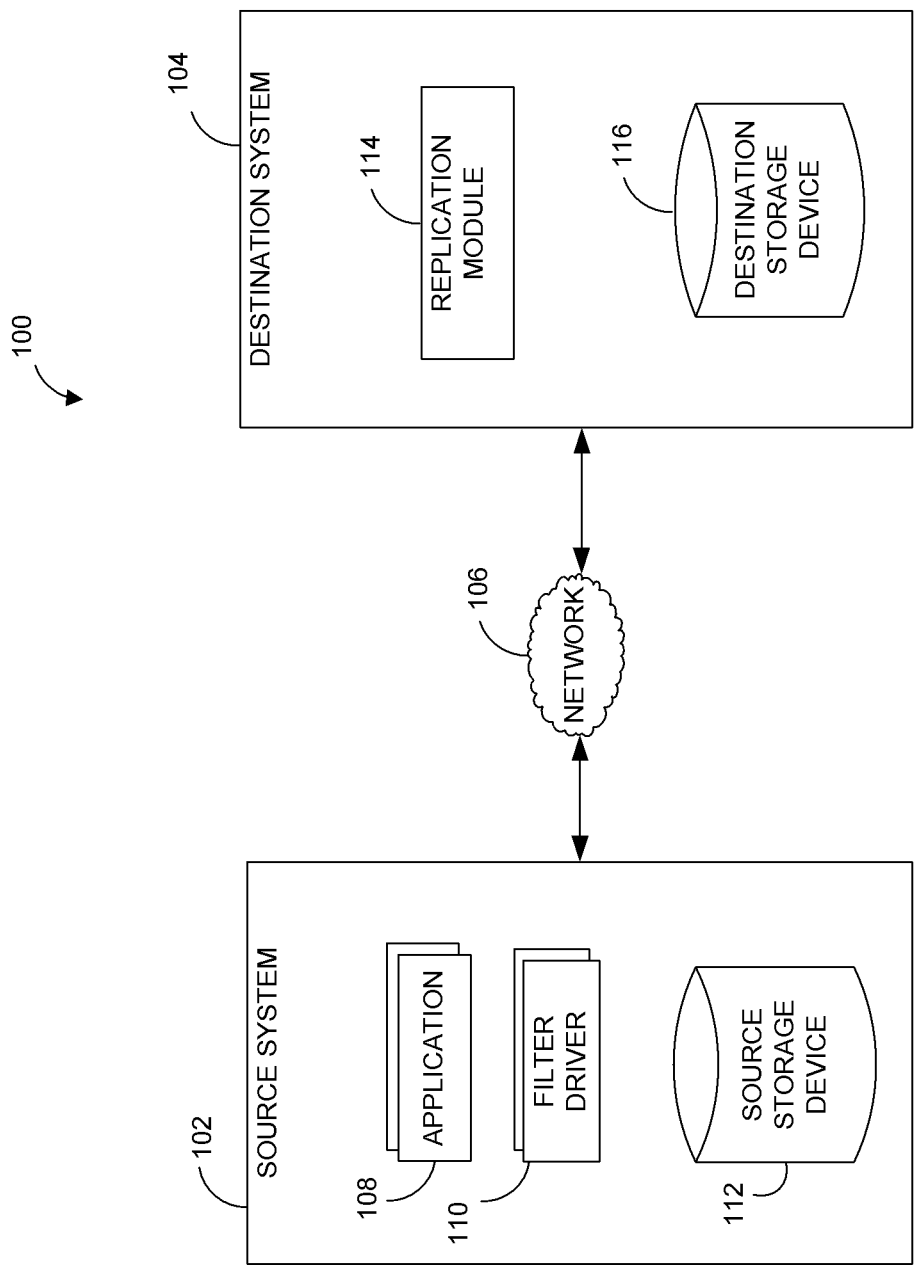
FIG. 1 illustrates a block diagram of a data replication system according to certain embodiments of the invention.

FIG. 1 illustrates a block diagram of a data replication system 100 according to certain embodiments of the invention. As shown, the replication system 100 comprises a source system 102 capable of communicating with a destination system 104 by sending and/or receiving data over a network 106. For instance, in certain embodiments, the destination system 104 receives and/or stores a replicated copy of at least a portion of data, such as application-specific data, associated with the source system 102.

The illustrated network 106 advantageously comprises any means for communicating data between two or more systems or components. It certain embodiments, the network 106 comprises a computer network. For example, the network 106 may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like. In embodiments wherein the source system 102 and destination system 104 are part of the same computing device, the network 106 may represent a communications socket or other suitable internal data transfer path or mechanism.

As shown, the source system 102 comprises one or more applications 108 residing on and/or being executed by a computing device. For instance, the applications 108 may comprise software applications that interact with a user to process data and may include, for example, database applications (e.g., SQL applications), word processors, spreadsheets, financial applications, management applications, e-commerce applications, browsers, combinations of the same or the like. For example, in certain embodiments, the applications 108 may comprise one or more of the following: MICROSOFT EXCHANGE, MICROSOFT SHAREPOINT, MICROSOFT SQL SERVER, ORACLE, MICROSOFT WORD and LOTUS NOTES.

The source system 102 further comprises one or more processes, such as filter drivers 110, that interact with data (e.g., production data) associated with the applications 108. For instance, the filter driver 110 may comprise a file system filter driver, an operating system driver, a filtering program, a data trapping program, an application, a module of the application 108, an application programming interface ("API"), or other like software module or process that, among other things, monitors and/or intercepts particular application requests targeted at a file system, another file system filter driver, a network attached storage ("NAS"), a storage area network ("SAN"), mass storage and/or other memory or raw data. In some embodiments, the filter driver 110 may reside in the I/O stack of the application 108 and may intercept, analyze and/or copy certain data traveling from the application 108 to a file system.

In certain embodiments, the filter driver 110 may intercept data modification operations that include changes, updates and new information (e.g., data writes) with respect to the application(s) 108 of interest. For example, the filter driver 110 may locate, monitor and/or process one or more of the following with respect to a particular application 108, application type or group of applications: data management operations (e.g., data write operations, file attribute modifications), logs or journals (e.g., NTFS change journal), configuration files, file settings, control files, other files used by the application 108, combinations of the same or the like. In certain embodiments, such data may also be gathered from files across multiple storage systems within the source system 102. Furthermore, the filter driver 110 may be configured to monitor changes to particular files, such as files identified as being associated with data of the applications 108.

In certain embodiments, multiple filter drivers 110 may be deployed on a computing system, each filter driver being dedicated to data of a particular application 108. In such embodiments, not all information associated with the client system 102 may be captured by the filter drivers 110 and, thus, the impact on system performance may be reduced. In other embodiments, the filter driver 110 may be suitable for use with multiple application types and/or may be adaptable or configurable for use with multiple applications 108. For example, one or more instances of customized or particularizing filtering programs may be instantiated based on application specifics or other needs or preferences.

The illustrated source system 102 further comprises a source storage device 112. The source storage device 112 may include any type of media capable of storing data. For example, the source storage device 112 may comprise magnetic storage (such as a disk or a tape drive) or other type of mass storage. In certain embodiments, the source storage device 112 may be internal and/or external to (e.g., remote to) the computing device(s) having the applications 108 and the filter drivers 110.

As further illustrated in FIG. 1, the destination system 104 comprises a replication module 114 and a destination storage device 116. In certain embodiments, the replication module 114 is configured to monitor and/or manage the copying of data from the source system 102 to the destination system 104, such as data retrieved by the filter drivers 110. In yet other embodiments, the replication module 114 is a "dumb" server or terminal that receives and executes instructions from the source system 102.

The destination storage device 116 may include any type of media capable of storing data, such as replication data sent from the source system 102. For example, the destination storage 116 device may comprise magnetic storage (such as a disk or a tape drive) or other type of mass storage. In certain embodiments, the destination storage device 116 may be internal and/or external to the computing device(s) having the replication module 114.

In certain embodiments, the source storage device 112 and/or the destination storage device 116 may be implemented as one or more storage "volumes" that include physical storage disks defining an overall logical arrangement of storage space. For instance, disks within a particular volume may be organized as one or more groups of redundant array of independent (or inexpensive) disks (RAID). In certain embodiments, either or both of the storage devices 112, 116 may include multiple storage devices of the same or different media.

Figure 2:
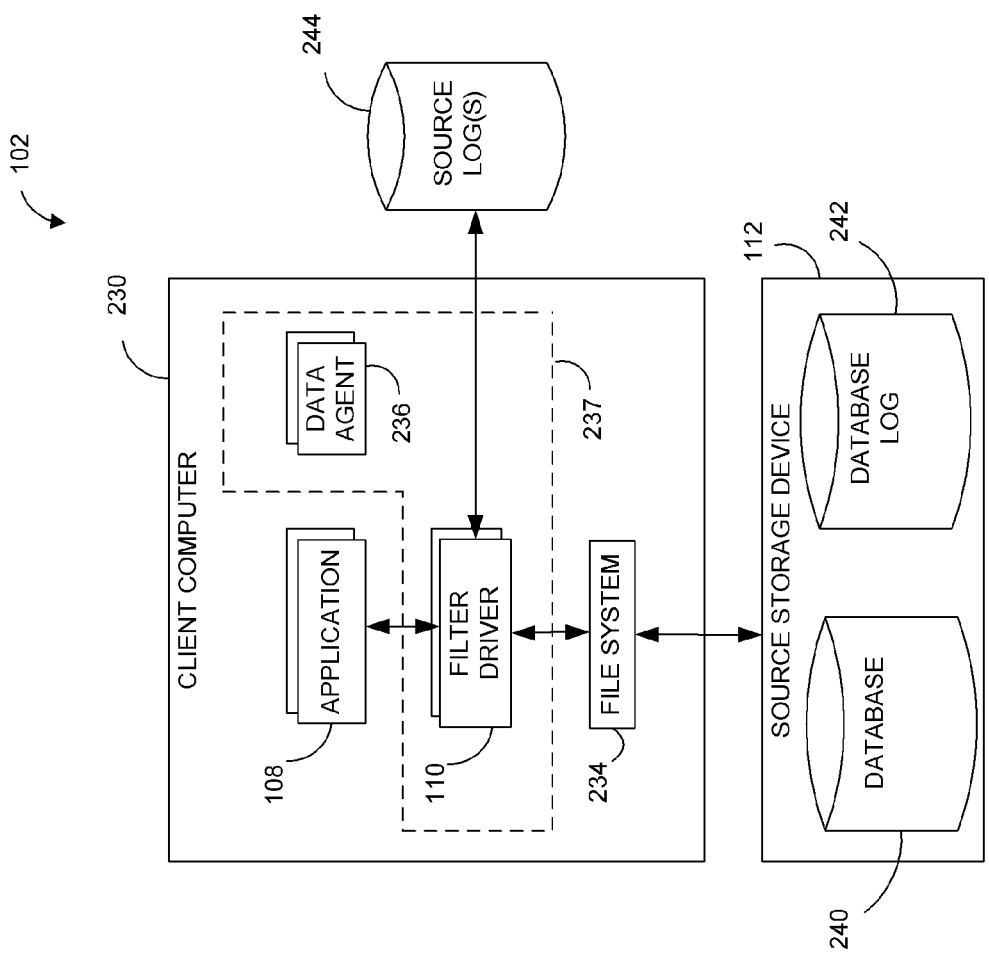
FIG. 2 illustrates a block diagram of an exemplary embodiment of a source system of the data replication system of FIG. 1.

FIG. 2 illustrates a block diagram of an exemplary embodiment of the source system 102 of FIG. 1. In particular, the source system 102 comprises a client computer 230 on which the application(s) 108 and the filter driver(s) 110 reside and/or are executed. In certain embodiments, the client computer 230 comprises any computing device capable of processing data and includes, for example, a server computer, a workstation, a personal computer, a cell phone, a portable computing device, a tablet computer, a handheld computing device, a personal digital assistant (PDA) or the like.

The illustrated client computer 230 further comprises a file system 234 for organizing files and directories accessible by the client computer 230. In certain embodiments, the file system 234 comprises a data structure usable to keep track of a collection of files and/or directories stored on the source storage device 112. The file system 234 may include, for example, a local file system, a network file system, a file server, a management program or the like, or may include multiple file systems accessible by an operating system. For instance, in embodiments wherein the storage device 112 is associated with multiple volumes, each volume may be associated with its own file system 234, or a single file system 234 may span across the multiple volumes.

The illustrated client computer 230 also comprises one or more data agents 236. In certain embodiments, the data agent 236 comprises a module responsible for performing data and/or storage tasks related to the client computer 230. For example, the data agent 236 may manage and/or coordinate the compilation of and/or transferring of replication data from the source system 102. In other embodiments, the data agent 236 may provide archiving, migrating, and/or recovery of client computer data.

In certain embodiments, the client computer 230 comprises a plurality of data agents 236, each of which performs data management operations related to data associated with each application 108. In such embodiments, the data agent 236 may be aware of the various files, folders, registry files and/or system resources that are impacted by a particular application 108. For instance, the data agent 236 may be programmed to detect data management requests by a particular application 108 and determine which files, folders and/or system resources are associated with the data management requests.

In certain embodiments, the data agent 236 is configured to perform data management operations in accordance with one or more "storage policies" or other preferences. A storage policy may include a data structure or other information having a set of preferences and other storage criteria for performing a storage operation. The preferences and storage criteria may include, but are not limited to, information regarding storage locations, relationships between system components, network pathways, retention policies, data characteristics, compression or encryption requirements, preferred system components, combinations of the same or the like.

In certain embodiments, one or more data agents 236 are configured to perform an initial "seeding" or synchronization process of a replication process. For example, prior to (or concurrently with) data replication using one or more filter drivers 110, the data agent 236 may perform a scan of the source system 102 (e.g., the source storage device 112). For instance, the data agent 236 may evaluate the folders and/or directory structure of the source system 102 to determine which folders are used by a particular application 108. In certain embodiments, the data agent 236 may also identify, arrange, and queue necessary data of the application 108 to provide a proper platform for replication. For example, the data agent 236 may populate source log(s) 244 with application data that has already been written to the source storage database 112. In certain embodiments, this populating is performed based on a snapshot or point-in-time copy of the file system. In yet other embodiments, as described below, the data agent 236 is configured to scan a live file system.

In certain embodiments, when the data agent 236 is initially installed or enabled on the client computer 230, the data agent 236 may evaluate the application 108. For instance, the data agent 108 may determine the application's organizational structure, which may include, for example, folder, directory and file information. The information gathered by the data agent 236 may be sufficient to define a complete "set" of information to be replicated such that suitable baseline data representing the current operational state of the application 108 is identified. In some instances, this initial process may require the examination and identification of data related to application operations occurring prior to the installation of data agent 236. The data agent 236 may also be configured to identify general configuration and operational information regarding the application 108.

In certain embodiments, the data agent 236 may be configured to access and/or monitor particular files, folders, directories, registries, preferences and/or other like data structures for information to be replicated. All or a portion of the information gathered by the data agent 236 may be copied over to the destination system 104 as part of the initial seeding or initialization process. After the seeding process is complete, data replication may occur on a substantially continuous basis based on data transfers occurring between application(s) 108 and source storage device 112. In certain embodiments, the seeding process may occur substantially concurrently with execution of the application(s) 108. For instance, data operations from the application(s) 108 may be temporarily stored in a queue or buffer until the seeding process, or a portion thereof, is complete.

As shown in FIG. 2, the client computer 230 communicates through the file system 234 with the source storage device 112, which further includes a database 240 and database logs 242. In yet other embodiments, the client computer may communicate with NAS or the like. In certain embodiments, data intended for the source storage device 112 may be first written to a file in the database logs 242 and subsequently committed to the database 240 in accordance with data management techniques for enhancing storage operation performance. Moreover, although only one database 240 and one database log 242 are depicted in FIG. 2, it will be understood that the source storage device 112 may comprise additional databases 240, database logs 242 and/or other directory and file storage structures to meet the storage needs of the client computer 230.

As illustrated in FIG. 2, the filter driver 110 is advantageously located between the application 108 and the file system 234. For instance, the filter driver 110 may be deployed in the stack as an I/O buffer and/or process in the data path between the application 108 and the file system 234. In such embodiments, the filter driver 110 may intercept, snoop, supervise, trap, process or otherwise be cognizant of some or all operations (e.g., data modification operations, file modification operations, read operations and the like) from the application 108 to its associated location(s) on the source storage device 112.

For example, in certain embodiments, the filter driver 110 may communicate with an associated data agent 236 to determine where data for a particular application 108 will be stored (e.g., particular folders on the file system 234). In certain embodiments, the filter driver 110 and/or the data agent 236 may also monitor and/or parse data management operations to determine if new or additional folders are affected by the production volume data of the particular application 108. In certain embodiments, the data agent 236 may monitor data management operations and/or other data for other purposes, such as, for example, for satisfying a query or command by a storage manager component or the like.

As further depicted in FIG. 2, one or more of the filter drivers 110 and associated data agent(s) 236 may be grouped together as a single module, such as driver module 237. In yet other embodiments, the data agent(s) 236 may be separate from the driver module 237.

As discussed above, in certain embodiments, the filter driver 110 is preferably configured to monitor and/or filter data management operations associated with a particular application 108. The filter driver 110 may be further configured, according to predefined criteria, to cause particular data to be written to one or more source logs 244 for subsequent replication. For instance, the filter driver 110 may be configured to intercept, scrub, parse and/or trap data management operations and to populate the source logs 244 with changes associated therewith.

In certain embodiments, the filter driver 110 may examine the data management operation in progress, determine whether the type of operation is one of interest for replication purposes, and/or copy select or all data to source log 244. For instance, as discussed above, the filter driver 110 may determine if the data management operation concerns data in one or more files determined as relevant to replication (e.g., files that may store data for a particular application). In other embodiments, the filter driver 110 may generate log entries for all data management operations.

The filter driver 110 may further process and/or traverse the data and copy, generate or examine other relevant information, such as a log entry number, time information (e.g., time stamp), application type, data size and start field, combinations of the same or the like, that may be useful in the replication process. In other embodiments, the filter driver 110 may monitor files on the source storage device 112 for modifications of data relating to the subject application 108. For instance, as disclosed above, the filter driver 110 may monitor a select group of files, which have been associated with the application 108, or folders to detect changes to data stored therein. In certain embodiments, the filter driver 110 or other system component may detect when a data write operation of the application is made to a file or folder not in the select group. The filter driver 110 or other system component may then determine from the properties of the data write modification if the subject folder or file should be added to the select group (for subsequent monitoring).

In certain embodiments, the filter driver 110 is deployed (e.g., by data agent 236) on the client computer 230 prior to the beginning of the replication process. In embodiments wherein the filter driver 110 is deployed after replication begins, pertinent application data already stored on the source storage device 112 may be copied to the source logs 244 prior to the replication process (e.g., during the initial "seeding" process described above).

In certain embodiments, the filter driver 110 may be enabled and/or disabled by the data agent 236. For instance, enabling the filter driver 110 may allows it to populate an associated source log 244 with log entries from application data passed from the application 108 to the source storage device 112. When the filter driver 110 is disabled, data may pass directly through to the source storage device 112 without being copied to the source logs 244.

In certain embodiments, the data agent 236 monitors the storage capacity of the source logs 244. For instance, when one or more of the source logs 244 reach a particular memory threshold, the data agent 236 may open a socket and communicate to the destination system 104 that a copy of the source log 244 is ready to be transmitted. In other embodiments, the data agent 236 may be configured to copy the source log 244 to the destination system 104 at periodic intervals or in accordance with other predefined criteria. In yet other embodiments, the source logs maintain the history of previous intercepted changes (e.g., the last N gigabytes of previous changes). As just one example scenario, the history of intercepted changes can be used in the event that network connectivity is temporarily lost. For example, the history of intercepted changes can be accessed, and any changes that were not transmitted due to the connectivity interruption can be transmitted or retransmitted to the appropriate destination. This may be particularly useful where there are multiple destination devices and where the changes are successfully transmitted to a first subset of the multiple destination devices, but not a second subset of the multiple destination devices. In this case, the history can be accessed to transmit or retransmit the appropriate intercepted changes to the second subset of destination devices.

In certain embodiments, the source system 102 communicates with the associated destination system to verify that the two systems are synchronized. For instance, the source system 102 may receive from the destination system an identification (e.g., unique serial number) of the data write operation currently being replicated by the destination system. The source system 102 may then compare the received identification with data write operation being forwarded to the source storage device 112.

Figure 3:
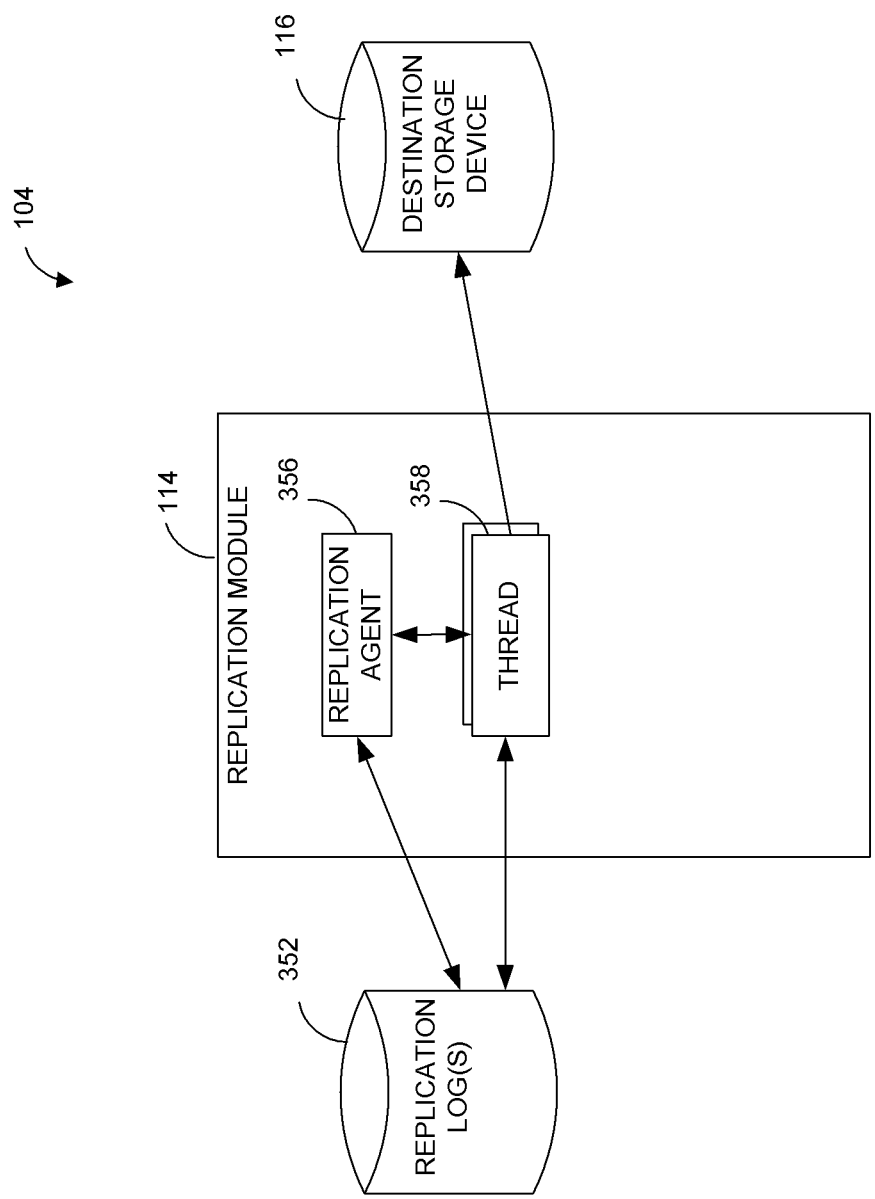
FIG. 3 illustrates a block diagram of an exemplary embodiment of a destination system of the data replication system of FIG. 1.

FIG. 3 illustrates a block diagram of an exemplary embodiment of the destination system 104 of FIG. 1. In particular, the destination system 104 comprises the replication module 114, which communicates with one or more replication logs 352 and the destination storage device 116. In certain embodiments, the replication module 114 comprises any computing device capable of processing data and includes, for example, a server computer, a workstation, a personal computer or the like.

In certain embodiments, the replication logs 352 contain a copy of the data stored on the source logs of a client system, such as the source logs 244 of FIG. 2. The replication logs 352 comprise any type of memory capable of storing data including, for example, cache memory. In certain embodiments, the replication logs 352 may reside on the destination system 104, such as, for example, on the destination storage device 116, or at least a portion of the replication logs 352 may be external to the destination system 104. In certain embodiments, once the replication logs 352 have been populated with the data from the source logs 244, the data on the source logs 244 is available to be erased and/or overwritten to conserve memory space.

The replication module 114 of the destination system 104 further comprises a replication agent 356 and one or more processes, such as threads 358. In certain embodiments, the replication agent 356 comprises one or more software modules that coordinate the transfer of data from the replication logs 352 to the destination storage device 116.

For example, in certain embodiments, the replication agent 356 instantiates an appropriate number of threads, processes, or routines, 358 for copying data from the replication logs 352 to the destination storage device 116. In certain embodiments, the number of threads 358 is based on one or more of the following factors: the number of log files sent from the source logs 244 to the replication logs 352, information received from the data agent(s) 236, information generated by the filter driver(s) 110, and the type(s) of application data being tracked.

In certain embodiments, the replication agent 356 further includes mapping or correlation information that determines when and to where the data from the replication logs 352 is copied by the threads 358. In certain embodiments, such mapping information may be based on system- or user-defined parameters and/or may be automatically generated, such as based on the status of the destination storage device 116.

The one or more threads 358 (or processes) direct movement of data from replication logs 352 to the appropriate location on the destination storage device 116. In operation, in certain embodiments, the threads 358 advantageously process (or traverse) replication logs 352 for particular types of data and then copy that data to certain locations on one or more replication volumes based on data paths identified by the replication agent 356 and/or associated with each thread 358. For example, the thread(s) 358 may sequentially process each entry in the replication log 352 and write the associated data to the destination storage device 116.

In certain embodiments, each thread 358 is assigned to a hard-coded path pair, which includes (i) a source path identifying the location on the source storage device 112 associated with a data management operation (e.g., c:\Folder\) and (ii) a destination path identifying the location on the destination storage device 116 to receive the replicated data (e.g., D:\folder\) from the thread 358.

Figure 4:
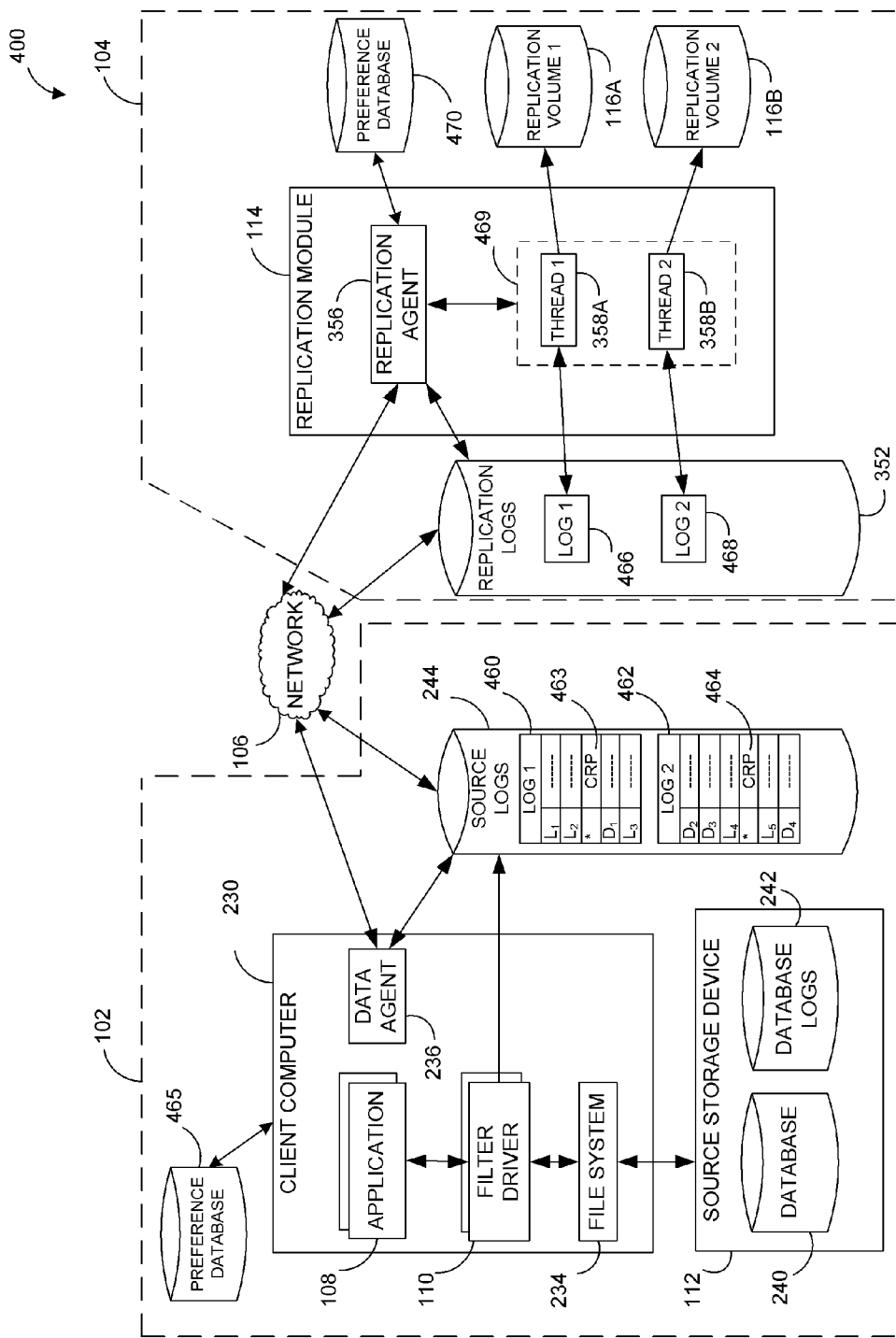
FIG. 4 illustrates a block diagram of further details of an exemplary embodiment of the data replication system of FIG. 1.

FIG. 4 illustrates further details of a replication system 400 in accordance with certain embodiments of the invention. As illustrated, the replication system 400 comprises the source system 102 in communication with the destination system 104, portions of which are described in more detail with respect to FIGS. 1-3.

As detailed above, in certain embodiments, the filter driver 110 preferably substantially continuously populates data relating to one or more of the applications 108 to the source logs 244. As shown in FIG. 4, the source logs 244 further comprise a first log file 460 and a second log file 462. In certain embodiments, the filter driver 110 sequentially writes log entries to the source logs 244, and when a certain capacity of the first log file 460 is reached, the filter driver 110 begins populating the second log file 462 with log entries.

In yet other embodiments, data relating to each application 108 of interest may be written to a particular log file established for that application. For example, with reference to FIG. 4, the first log file 460 may relate to a first application of interest, whereas the second log file 462 may relate to a second application of interest.

In certain embodiments, each of the log files of the source logs 244 may be established by the data agent(s) 236 and/or the filter driver(s) 110 as part of an initial deployment or initialization process. Moreover, data may be written to the source logs 244 as determined by preferences stored on or accessed by the client computer 230 in a preference database 465.

For example, as further shown in FIG. 4, the first and second log files 460, 462 may comprise a series of entries, each having an identifier that indicates the sequence order and/or type of entry being made. For instance, the illustrated entry identifier ("L1") may indicate that the particular entry represents a first database entry in a particular order of operation. The illustrated entry identifier ("L2") may indicate a second database entry in a particular order of operation, and so forth. The illustrated entry identifier ("D1") may indicate that the particular entry represents a first database commit entry in a particular order of operation. Thus, in the example described above, the log entries identified by L1 and L2 may correspond to modifications associated with a particular database transaction, and the log entry identified by D1 may correspond to a commit command for the particular transaction.

It will be understood that, although only two log files are shown in FIG. 4, more or fewer log files may be used with embodiments of the invention. For instance, multiple applications 108 may be monitored by the filter drivers 110 and, thus, additional log files may be added as necessary or desired. Moreover, although in some embodiments, each application 108 and each log file in the source logs 244 may have its own associated filter driver 110, in other embodiments, a single filter driver 110 may be deployed and configured for use with multiple applications 108 such that there are separate log files for each monitored application 108.

With continued reference to FIG. 4, in certain embodiments of the invention, the data agent 236 and/or filter driver 110 may be advantageously configured to pause, or quiesce, the application 108 during data replication. For instance, the data agent 236 may cause the application 108 to temporarily suspend data management operations to the source storage device 112 once the application 108 reaches a known "good," "stable" or "recoverable" state. In certain embodiments, such a state may be defined as when particular computing operations of the application 108 are complete to a point such that further operation, recovery and/or rolling back of the application 108 may occur, based on the recorded data, without the loss of critical information or computing operations needed for operation of the application 108. This point of referential integrity is generally referred to herein as a known good state of the application 108.

In certain embodiments, the data agent 236 instructs the quiescing of the application 108 through an application programming interface (API). For instance, the data agent 236 may send a command (e.g., FLRSNAP.FOO) to the application 108 that causes the application 108 to quiesce. When the application 108 has placed itself in a known good state, the application 108 may send an acknowledgment to the data agent 236.

In certain embodiments, once the data management operations are suspended, the I/O buffers in the data path of the application are flushed (and/or the writes in the queues are flushed), and the source logs 244 are populated. For example, some or all of the pending data management operations (e.g., as of the time of the suspension of the application) may be allowed to complete and/or percolate through the data path. The filter driver 110 and/or data agent 236 then inserts a logical marker or tag in the source log file denoting that a "consistency point" or "consistency recovery point" has been reached. In some embodiments, the consistency point indicates the time at which the application 108 is at a known good state. For instance, in certain embodiments, the data agent 236 instructs the filter driver 110 to insert a consistency point entry into the source logs 244.

FIG. 4 illustrates consistency point entries as log entries 463 and 464 in, respectively, the first and second log files 460, 462. As shown, the consistency point entries are represented by "CRP" in the source logs 244. In certain embodiments, once the consistency point is identified and inserted into the source log 244, the data agent 236 may instruct the application 108 to "restart" so as to resume normal data management operations from the application 108 to the source storage device 112.

Notwithstanding the foregoing, it will be understood that, in certain embodiments, although application 108 is quiesced, it need not actually pause or suspend operation during the quiescent period. Rather, the application 108 may continue to operate substantially normally but may internally queue, or otherwise buffer, data management operations intended for the source storage device 112. After the quiescent period, the buffered modification operations may be allowed to complete (i.e., be sent to the source storage device 112).

In yet other embodiments, policies for the frequency of consistency point entries may be automatically generated. For instance, the data agent 236 may be configured to quiesce the application 108 based on the status (e.g., capacity) of the source logs 244, the replication logs 352 and/or the destination storage device 116. In yet other embodiments, quiescing of the application 108 may be performed based on an automatic reporting procedure. For instance, a module of the replication system 400 may be configured to gather, receive and/or analyze information associated with a failure rate and/or health of applicable servers. Additional details of such status monitoring are provided in U.S. patent application Ser. No. 11/120,619, filed May 2, 2005, now published as US 2006-0053261 A1, which is hereby incorporated herein by reference in its entirety. For example, the frequency of consistency points may be selected or adjusted to mitigate risks detected in a storage network.

In certain embodiments, one or more log entries in the source logs 244 are preferably associated with journal sequence numbers and/or time information, such as, for example, assigned a time stamp indicative of the client system time with which the particular log entries are associated. For instance, the time information may indicate the time at which: the log entry is written to the source log 244, the data management operation is generated by the application 108, the data modification operation is committed to disk or the like. In certain embodiments, not all the log entries are assigned a time stamp. Rather particular types of data, such as for example, consistency point markers and/or database commit entries, are assigned time stamps.

In certain embodiments of the invention, the data agent 236 coordinates with the replication agent 356 to copy log files from the source logs 244 to the replication logs 352. Such copying may be initiated based on any suitable factor, such as, for example, preset copying intervals, capacity thresholds reached in the source logs 244, time lapsed since the last copy operation, replication agent 356 requests for a copy operation, and/or based on specific parameters or requirements associated with a particular application 108. For instance, certain data-sensitive applications may be copied more frequently than other applications in order to reduce the amount of potential data loss due to a failure occurring between copy operations.

As further illustrated in FIG. 4, the replication logs 352 include a first log file 466 and a second log file 468. In certain embodiments, each of these log files 466, 468 corresponds, respectively, to the first log file 460 and the second log file 462 of the source logs 244. For instance, data may be transferred between the replication log(s) 352 and the source log(s) 244 such that the order in which the data was stored in the source log(s) 244 is preserved. In addition, the log files may be recreated in the replication log(s) 352 to reflect the organization of source logs 244. For example, the first log file 460 and the second log file 462 in the source logs 244 may be transferred and recreated by the replication agent 356 and/or the data agent 236. In other embodiments, however, data may be transferred and stored in a different order without preserving source system correlations and/or may be rearranged on or during transfer to or upon arrival in replication volumes 116A, 116B.

The illustrated destination system 104 further comprises an optional preference database 470 in communication with the replication agent 356. In certain embodiments, the preference database 470 includes storage policies or other preferences usable by the replication agent 356 in managing data. For instance, the stored preferences may indicate the desired frequency at which the threads 358 should copy the data from the destination logs 352 to the replication volumes 116A, 116B. The preference database 470 may also store path information for detailing to which location(s) on the replication volume(s) 116A, 116B the data in the replication log(s) 352 should be copied. In yet other embodiments, the preference database 470 may include storage policies that dictate particular criteria for performing one or more data management operations on the replicated data.

With continued reference to FIG. 4, the replication module 114 further comprises one or more processes, such as a replication set or a log processing module 469 with a first thread 358A and a second thread 358B. In certain embodiments, as discussed above, the threads 358A, 358B are instantiated by the replication agent 356 to transfer data from the first and second replication logs 466, 468 to the first replication volume 116A and/or the second replication volume 116B.

In certain embodiments, the threads 358A, 358B utilize time stamp or other temporal information that enables processing and/or replaying of modification operations. For example, based on time stamp information, the threads 358A, 358B may rearrange the replication data such that the data is stored on the one or more replication volumes in the proper order (e.g., the order in which the data was intended to be written to the source storage device 112). In such embodiments, the replicated data may be subsequently retrieved, recalled or otherwise accessed or processed and may be used to accurately restore the state of the application 108 as it existed at a given point in time. In yet other embodiments, other data management operations (e.g., searching, data classification) may be performed on the replicated data.

In certain embodiments, instructions for the storage operations are sent from the data agent 236 on the source system 102. For instance, the instructions may be included in the log file entries copied from the source system 102. In yet other embodiments, the storage operations are coordinated by the replication agent 356 (e.g., according to storage polices stored in the preference database 470) in combination with, or independent of, the data agent 236. In yet other embodiments, policies for storage operations may be stored in another system management component (e.g., a storage manager module).

In certain embodiments, a snapshot is taken for each volume in which data is being replicated. For instance, with reference to FIG. 4, first thread 358A is writing to the first replication volume 116A, and second thread 358B is writing to the second replication volume 116B. In such embodiments, when the first and second threads 358A, 358B arrive at a consistency point log entry, a snapshot is taken of the replicated data in each replication volume 116A, 116B.

In certain preferred embodiments, when the snapshot is performed at a particular consistency point, the time of the snapshot is advantageously logically associated with the time that the consistency point was generated at the client system 102 (e.g., the client system time of the known good state of the application 108). For instance, the time stamp of the consistency point may be used to logically assign a "time" to the snapshot of the replicated data. In such a process, the snapshot of the replicated data then appears as if the snapshot was directly taken on the data in the source system 102 at the time of the consistency point. Such a process allows for the snapshot data to be viewed as a direct copy of the production volume data for a particular application (e.g., source storage device 112) at a certain point in time (e.g., the time of a known good state of an application).

While certain embodiments of storage operations have been disclosed as being usable with the replication system 400 of FIG. 4, a wide variety of other storage operations may also be performed on the replication data and/or in conjunction with consistency point information. For example, other copies of the replicated data may be performed, such as, but not limited to, creation, storage, retrieval, migration, deletion, auxiliary copies, incremental copies, differential copies, Hierarchical Storage Management ("HSM") copies, archive copies, backup copies, Information Lifecycle Management ("ILM") copies, other types of copies and versions of electronic data or the like.

In certain embodiments, after appropriate storage operations are performed on the replicated data, a message may be sent to other system management components (e.g., a snapshot manager and/or optional storage manager) indicating that the replication process is complete up to the time stamp associated with consistency point. At this point, the replication agent 356 may instruct copy operations associated with the threads 358A, 358B to resume.

Figure 5:
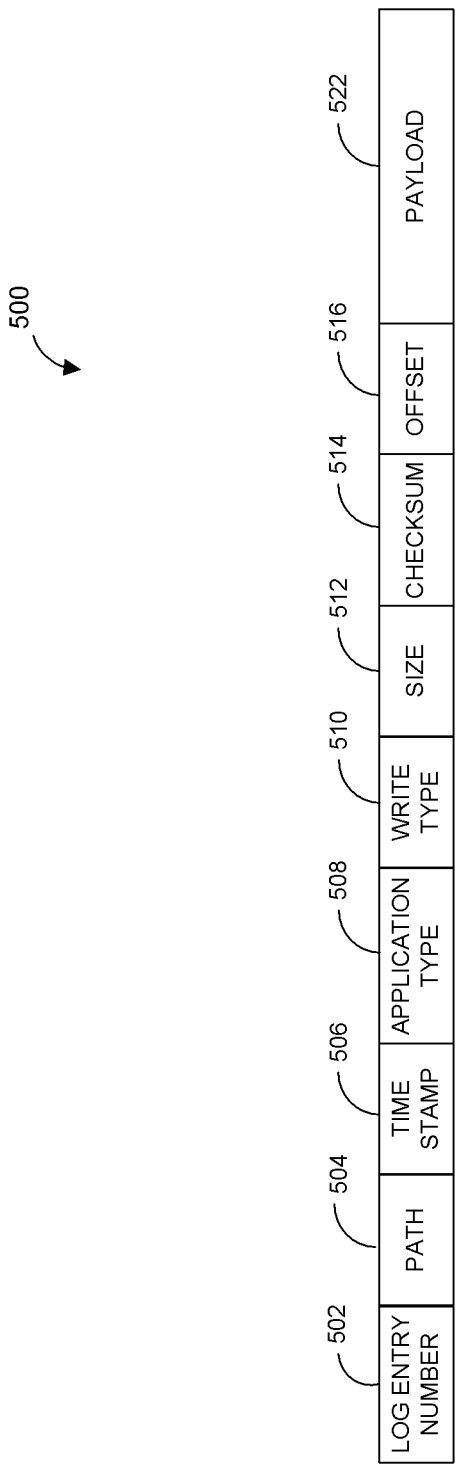
FIG. 5 illustrates various fields of an exemplary embodiment of a log entry usable by the data replication systems of FIGS. 1 and 4.

FIG. 5 illustrates an exemplary embodiment of a data structure of a log entry 500 usable with the replication systems described herein. In certain embodiments, the log entry 500 comprises information regarding modifications to data and/or files on the source storage device 112 and may include, for example, information regarding: which file was modified, the time of the modification, the type of modification, the relative data, a unique identification, combinations of the same or the like. For exemplary purposes, the various fields of the log entry 500 will be described with respect to a data write operation in the replication system 400 of FIG. 4.

In certain embodiments, the log entry 500 is initially generated by the filter driver 110 and is stored in the source log 244. For example, the log entry 500 may comprise a data word having a plurality of fields. As illustrated, the log entry 500 comprises a log entry number field 502, a path field 504, a time stamp field 506, an application type field 508, a write type field 510, a size field 512, a checksum field 514, an offset field 516 and a payload field 522.

The log entry number field 502 may include information regarding the entry number assigned to the log entry 500 for system management purposes such that entries may be tracked and reordered relative to one another if necessary. For example, as mentioned herein, log entries may be arranged in a temporally sequential manner based on the application write operation with which the particular log entry 500 is associated. In certain embodiments, log entry numbers or other information may be recycled over time once all the numbers in a particular range have been used. In yet other embodiments, the log entry number field 502 may be configured to store other types of identification data for labeling the log entry 500.

The path field 504 may include information regarding the file path on the source storage device 112 with which the data write operation was associated. For example, a path of "C:\DIR\USER\" may indicate that the log entry corresponds to an operation writing data to a folder or file on the source storage device having the designated pathname. In certain embodiments, the path field 504 may include an absolute file pathname. In other embodiments, the path field 504 may include an abbreviated pathname, an FID, and/or an inode (e.g., for UNIX-based systems).

Moreover, the path field 504 may include information relating to the log entry's replication volume destination, and thus may be useful in establishing or confirming correlation or pairing information used by the thread(s) 358A, 358B. For instance, in certain embodiments, the file path of a particular log file may be hard-coded to one or more particular replication volume(s).

The time stamp field 506 may include information relating to the time when the subject data write occurred. In certain embodiments, the time stamp is advantageously associated with the time of the client computer 230 on which the application 108 is executing. For instance, the filter driver 110 may access the source system time when generating the log entry

500. In other embodiments, the time stamp may be provided by the filter driver 110 and/or may be relative to the replication system time.

The application type field 508 may include information identifying the application type with which the log entry 500 is associated (e.g., MICROSOFT OUTLOOK data, MICROSOFT SHAREPOINT data, ORACLE data, SQL data, MICROSOFT WORD data, MICROSOFT INTERNET EXPLORER data or the like).

The write type field 510 may include information regarding the category of write data involved with the log entry 500. For instance, the write type may identify if the log entry 500 is associated with a database modification, a log write, a database commit command, a consistency point or the like. In certain embodiments, the information in the write type field 510 is used to implement parallelism between multiple threads when performing data replication. For instance, a first thread (e.g., thread 358A) may handle log write commands, and a second thread (e.g., thread 358B) may handle commit database commands. In certain embodiments, the data stored in the write type field 510 may be used for prioritizing the processing of various log entries (e.g., processing by the threads 358).

The size field 512 may include information relating to the size (e.g., the number of bytes) of the data being modified by the data write operation. In yet other embodiments, the size field 512 may contain information relating to the size of other or additional segments within the log entry 500, such as, for example, the size of the payload field 522.

The checksum field 514 may include information relating to error checking to ensure, for example, that the log entry 500, when created and subsequently transmitted, contains the expected number of bits and has not been corrupted or otherwise impermissibly changed. For instance, the checksum field 514 may store data representing the arithmetic sum of some or all of the fields in the log entry 500.

The offset field 516 may include information relating to the location within a file or portion of data that the data write is occurring. For instance, if the subject data write operation is associated with modifying the twentieth through the thirtieth bytes of a file or piece of data fifty bytes long, the offset field 516 may store a value of twenty. In such embodiments, the information in the offset field 516 may be used jointly with the information in the size field 512 to identify the entire portion of a file being modified. For instance, in the above example the size field 512 may store a value of eleven to indicate the length of the modified section (i.e., twentieth through thirtieth bytes).

The payload field 522 may include information relating to the data written from the application 108 to the source storage device 112. This information generally represents the application data captured by the filter driver 110 for replication and may include additional information for the ongoing operation or reconstitution of the application 108.

It will be understood that the illustrative filter driver log entry 500 shown in FIG. 5 merely represents one possible embodiment of a log entry suitable for use with embodiments of the invention and that other embodiments may be used if desired. For example, in other embodiments, the log entry 500 may comprise more or fewer fields to accommodate the requirements of the particular replication or storage operation system involved and/or to achieve certain data or management goals, such as conserving memory, increasing processing speed and increasing the amount of information in each log entry. For instance, in certain embodiments wherein the path determination for a particular log file or log entry is dynamic, the log entry 500 may not include the path field 504.

In other embodiments, the log entry 500 may include a priority field that may be used for prioritizing replication and/or data management operations of data associated with the log entry 500.

In other embodiments, the log entry 500 may concern a file attribute change rather than a data write operation. In such embodiments, the write type field 510 may identify the log entry 500 as being associated with a file attribute change. Furthermore, the log entry 500 may store information regarding the new file attribute but would not require offset or size values to be stored in the size field 512 and/or the offset field 516.

In yet other embodiments, as discussed in more detail below, the log entry 500 may not have a payload portion. Such embodiments can significantly reduce the size of the log files and/or increase system performance since copies of the actual data entries are not needed. Rather, information stored in the log entry 500 can be used by a file system driver (e.g., filter driver 110) to obtain a copy of the data from the source storage device 112, when need. Such information can be obtained from the path field 504, size field 512, offset field 516 and/or other data identification information, such as inodes, FIDs or the like.

Figure 6:
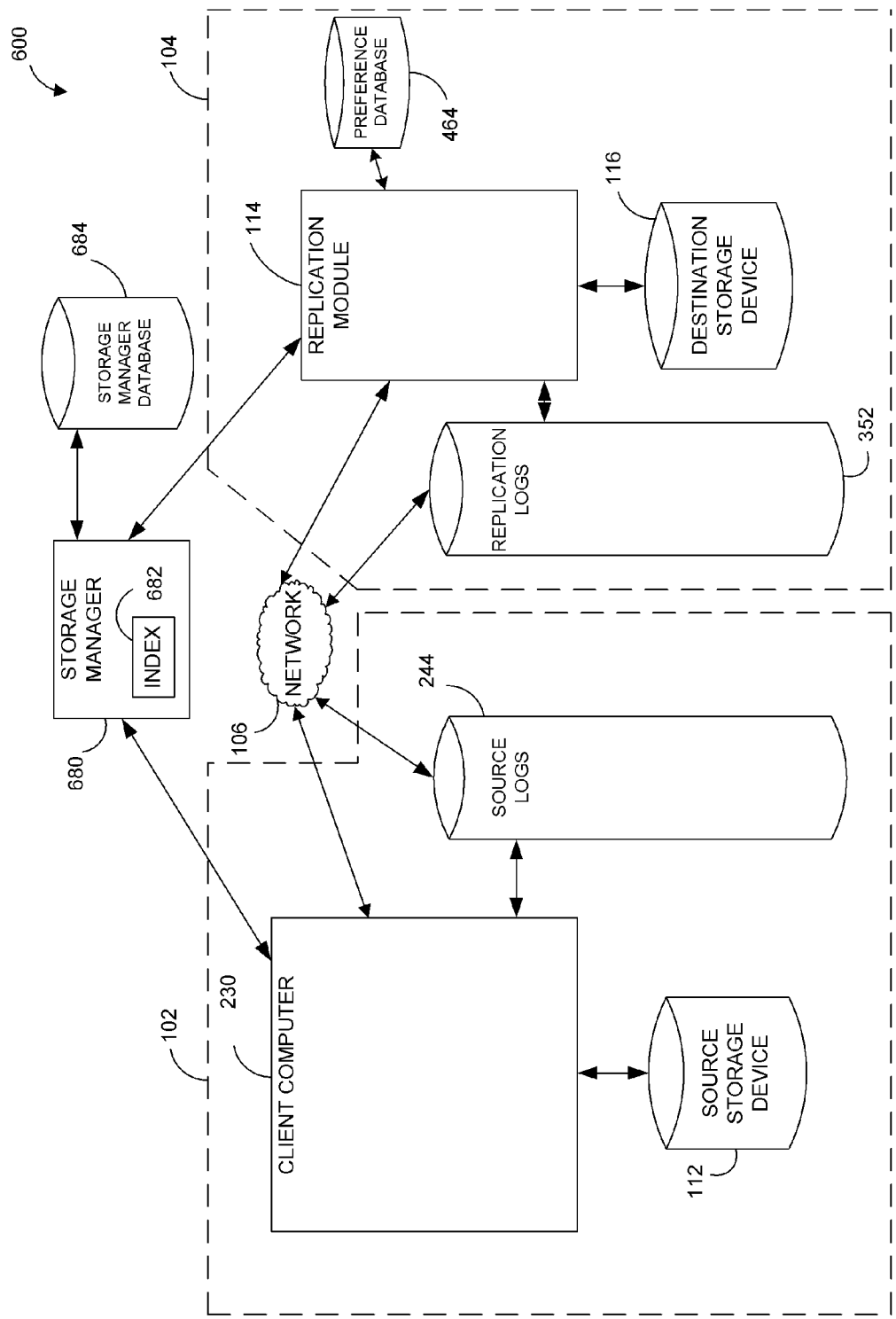
FIG. 6 illustrates a block diagram of an exemplary embodiment of the data replication system of FIG. 1 having a storage manager module.

FIG. 6 illustrates another embodiment of a replication system 600 similar to the replication system 400 of FIG. 4. As shown, the replication system 600 further includes a storage manager 680 that communicates with the source system 102 and the replication system 104. In certain embodiments, the storage manager 680 is a software module or application that is configured to direct the performance of one or more storage operations and, in particular, the replication of data from the source system 102 to the replication system 104. In further embodiments, the storage manager 680 may perform one or more of the operations or functions described above with respect to the data agent 236 and/or the replication agent 356. For instance, the storage manager 680 may direct and/or coordinate the performance of one or more storage operations on the replicated data (e.g., snapshots of the replicated data).

In certain embodiments, the storage manager 680 maintains an index 682, such as a cache, for storing information relating to: logical relationships and associations between components of the replication system 600, user preferences, management tasks, and/or other useful data. For example, the storage manager 680 may use its index 682 to track the location and timestamps of one or more snapshots of the replicated data. In certain embodiments, the storage manager 680 may track logical associations between one or more media agents (not shown) and/or storage devices.

The storage manager 680 may also use its index 682 to track the status of data management operations to be performed, storage patterns associated with the system components such as media use, storage growth, network bandwidth, Service Level Agreement ("SLA") compliance levels, data protection levels, storage policy information, storage criteria associated with user preferences, retention criteria, storage operation preferences, and other storage-related information. The index 682 may typically reside on the storage manager's hard disk and/or other database.

As shown in FIG. 6, the storage manager 680 further communicates with a database 684. In certain embodiments, the storage manager database 684 comprises a memory for storing system management information relating to the replication of data. For instance, the database 684 may be configured to store storage and/or restore policies, user preferences, the status or location of system components or data, combinations of the same and the like. In yet other embodiments, the database 684 may be configured to store information described above with respect to the index 682. In yet other embodiments, at least a portion of the index 682 may be stored on the database 684.

Additional details of storage manager modules useful with embodiments of the replication systems described herein are described in U.S. Pat. No. 7,389,311, issued Jun. 17, 2008, which is hereby incorporated herein by reference in its entirety.

Figure 7:
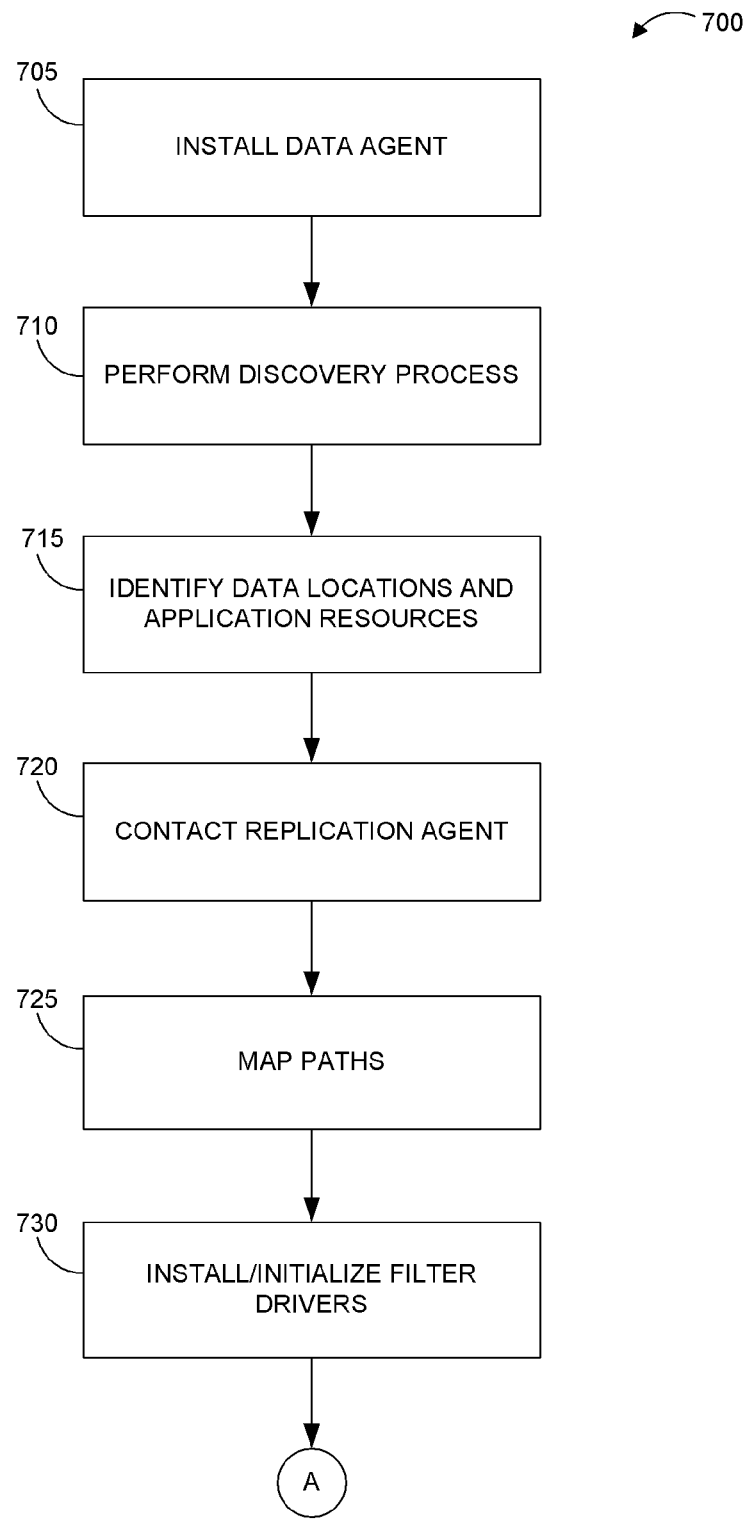
FIG. 7 illustrates a flow chart of an exemplary embodiment of an installation process usable by the data replication system of FIG. 4.

FIG. 7 illustrates a simplified flowchart of an initialization process 700 in accordance with certain embodiments of the invention. In particular, the initialization process 700 concerns certain preliminary processes and acts for setting up a system for performing data replication, as disclosed herein. For exemplary purposes, the initialization process 700 will be described hereinafter with reference to the components of the replication system 400 of FIG. 4.

The initialization process 700 begins with Block 705, wherein one or more data agent(s) 236 are installed on the client computer 230. In certain embodiments, the data agent 236 may be installed remotely from other portions of the replication system 400 based on a particular need or to conform to certain directives or resident storage policies. In other embodiments, the data agent 236 may be installed locally by a system user as desired. For instance, installation of the data agent 236 may include deployment and installation of object code files and supporting software.

In certain embodiments, the data agent 236 may be installed for each application 108 of interest, or one or more data agents 236 may be installed for a larger number of applications 108. Furthermore, in certain embodiments, an installation guide such as a wizard or other program may recommend the appropriate number and type of data agents 236 to install (which may be performed substantially automatically based on application and system configuration information).

At Block 710, the installed data agents 236 may perform certain auto-discovery routines in order to determine basic system and application information. In some embodiments, the auto-discovery routines may be considered part of the installation process. For example, the data agent 236 may begin the auto-discovery process by scanning and evaluating the folder and directory structure of the client computer 230 to determine which folders are used by a particular application 108. In certain embodiments, such information allows the data agent 236 to identify and locate files or other information necessary to replicate the current operating state of the application 108 of interest.

In certain embodiments, the scanning and evaluation process may involve scanning multiple physical and/or logical volumes associated with the source storage device 112 and/or within a given network or enterprise to locate the data and system configuration information necessary for data replication.

After the appropriate resources have been discovered and examined, the data agent 236 may identify, arrange, coordinate and/or queue the necessary data within various locations or instances of the application 108 to establish a platform for proper data replication (Block 715). In certain embodiments, this process may be a precursor for performing the initial seeding or synchronization operation described above.

Next, at Block 720, the data agent 236 communicates with the replication agent 356. For instance, the data agent 236 may transmit to the replication agent 356 information regarding the replication of data. The data agent 236 may also request information from the replication agent 356 and/or other network management components for any information that may bear on, or be related to, the correlation or mapping of network storage paths for replication data. For example, the data agent 236 may consult the preference database 470 of the destination system 104, the preference database 465 of the source system 102 and/or a storage manager component, for correlation or pairing information. Based on this information, data paths may be identified for use by threads 358 when copying data from the replication logs 352 to the replication volumes 116A, 116B. In certain embodiments, one or more data paths may be dynamically coded or determined, such as, for example, based on one or more storage policies and/or preferences.

At Block 730, the initialization process 700 includes installing and initializing the filter drivers 110. In certain embodiments, such installation and/or initialization is based at least in part on information obtained by the data agent 236 during the discovery or scanning process (Block 710). For example, in certain embodiments, one or more filter drivers 110 may be installed by the data agent 236 in the I/O path of the application(s) 108.

Figure 8:
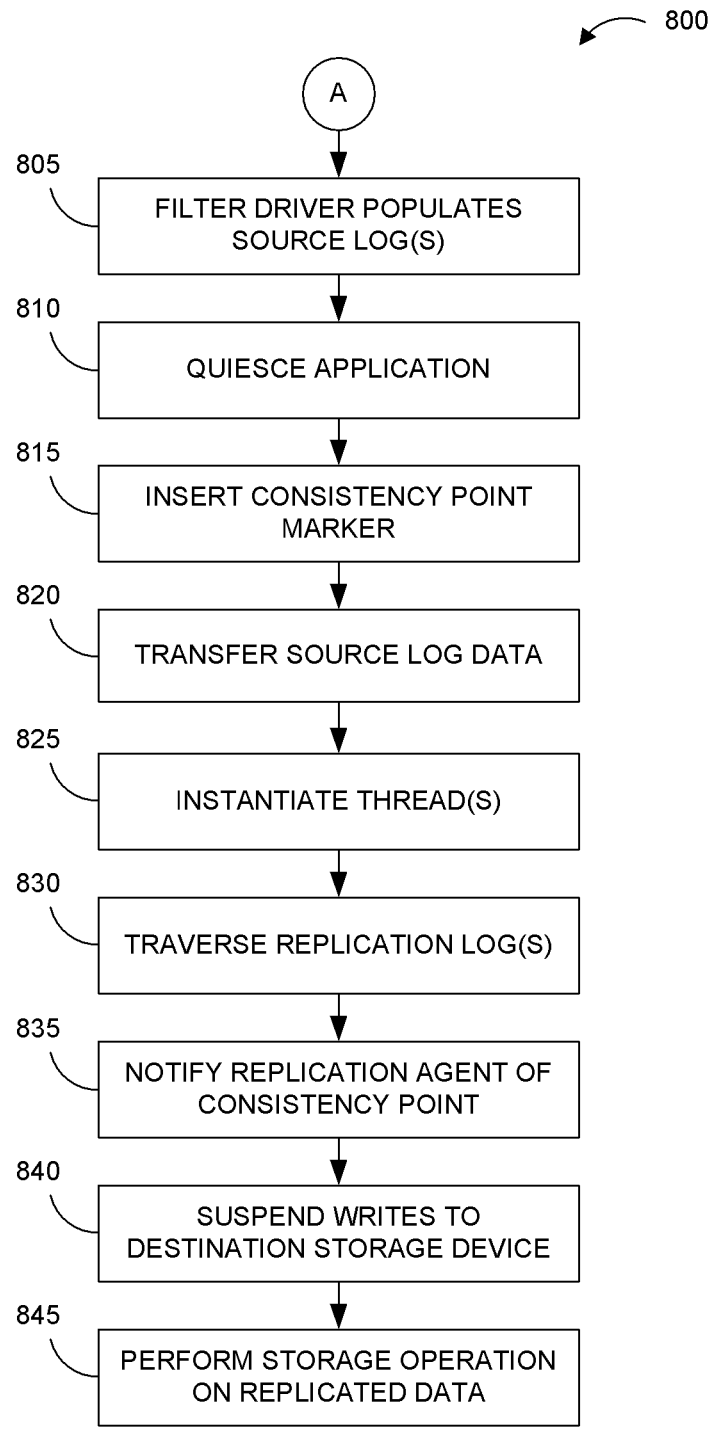
FIG. 8 illustrates a flow chart of an embodiment of a process of taking a consistency replication point usable by the data replication system of FIG. 4.

FIG. 8 illustrates a simplified flowchart of an embodiment of a process of taking a consistency replication point in accordance with certain embodiments of the invention. In particular, the replication process 800 involves the copying of data from a source system to a destination system. Furthermore, in certain embodiments, the replication process 800 is configured to be performed after completion of the initialization process 700 of FIG. 7. For exemplary purposes, the replication process 800 will be described hereinafter with reference to the components of the replication system 400 of FIG. 4.

The replication process 800 begins with Block 805, wherein the filter driver 110 populates the source log(s) 244 with data associated with the application 108, such as data identified by the data agent 236. As discussed in more detail above, such data may relate to data or file modification operations being passed from the application 108 to the source storage device 112. In certain embodiments, the filter driver 110 populates the source logs 244 in a temporally sequential manner such that operations and data are recorded in time descending (or ascending) order (e.g., first operation at the top and last operation at the bottom).

In certain embodiments, the data is populated in the source logs 244 in a format similar to the structure of the log entry 500 of FIG. 5. In other embodiments, the data may be populated in other suitable formats to satisfy the requirements of the particular replication system. For instance, the log file format may comprise a two- or multi-column structure, wherein the information in a first column may indicate the type of data operation performed, and the log entry's position in the log file indicates the order of the operation relative to other operations in the log file. The information in a second column may indicate the payload data associated with the data operation indicated by the first column.

After or concurrently with Block 805, the data agent 236 or other system component pauses or quiesces the application 108 (Block 810). As discussed above, such quiescing causes the application 108 to temporarily suspend data modification operations to the source storage device 112 once the application 108 reaches a known good state.

Once new modification operations are suspended and the associated source log 244 is populated based on the modification operations up to the known good state, the data agent 236 or other replication system component inserts a logical marker or tag in the source log 244 (Block 815). This "consistency point" denotes that the state of the data is such that the application 108 may be recovered or that further stable operation from that point going forward is ensured. Once the consistency point is identified and established, the data agent 236 may restart the application 108 such that data modification operations from the application 108 to the source storage device 112 resume.

As referenced by Block 820, the data agent 236 or other system management component coordinates the transfer of the data in the source logs 244. In certain embodiments, the data agent 236 coordinates with the replication agent 356 to copy data from the source logs 244 to the replication log(s) 352. For instance, the replication agent 356 and/or data agent 236 may open a network path or a communication socket between the source log(s) 244 and the replication log(s) 352. The log entries of the source log(s) 244 may then be transferred as described above to populate the replication log(s) 352. In certain embodiments, as the replication log 352 is populated, the replication agent 356 may also obtain configuration information from the data agent 236 or other system management component such as, for example, a storage manager. Such configuration information may identify aspects of the set of information being transferred as well as identify pairing information that correlates certain types of replication data with certain replication volumes or other storage destinations.

At Block 825, the replication process 800 includes instantiating one or more threads 358 to begin the transfer of data from the replication log(s) 352 to certain replication volumes 116A, 116B. In certain embodiments, the replication agent 356 is configured to instantiate one or more of the threads 358A, 358B. In certain embodiments, the threads 358 are instantiated and/or particularized based on pairing or correlation information received from a management component and/or based on certain system configuration information (e.g., available replication volumes), data path information, the type of information in the transferred data set, combinations of the same and the like. For example, the replication agent 356 may instantiate one or more threads 358 that correlate certain data types with certain data volumes and may specify primary and alternate data paths.

Once instantiated, the threads 358 process and/or traverse the replication log(s) 352 until a consistency point is encountered (Block 830). In certain embodiments, when reaching a consistency point, the thread 358 stops scanning the replication log 352 and notifies the replication agent 356 that the thread 358 has reached the consistency point (Block 835).

In certain embodiments, once all active threads 358 associated with traversing the replication logs 352 have notified the replication agent 356 that a consistency point has been reached, the replication process 800 moves to Block 840. At this point, the replicated data stored in the replication volumes 116A, 116B preferably represents a known good state of the application 108.

At Block 840, the replication agent 356 suspends further operation by the threads 358. For instance, the replication agent 356 may suspend data writes to the destination volumes 116A, 116B. At this point, the replication process 800 proceeds with Block 845, wherein one or more storage operations (e.g., snapshots) may be performed on the replicated data, which are described in more detail above.

As discussed above, one of the advantages of the embodiments of the data replication systems disclosed herein is that such systems are capable of translating information intercepted by a filter driver on a first (source) system into information that is suitable for replay (e.g., replication) on a second (destination) system. In certain embodiments, however, the identification of files or directories in the source system may not be suitable for use with the directory structure of the destination system.

For example, in UNIX-based systems, such as SOLARIS and LINUX, file system operations are generally identified as operations on "inodes" (or "vnodes") such that files are referenced by a unique inode number and/or by a combination of one or more directory inode numbers and a short name. Such systems often utilize file name or pathname translation algorithms to implement a user-level hierarchical view of the file system.

Such usage of inodes and short names, however, is not conducive for replaying data modification operations on a second system, such as occurs in the data replication systems disclosed herein. That is, a path having one or more inodes and/or short names does not provide a destination system with the appropriate information for performing the replicated data modification operation.

On certain operating systems (e.g., SOLARIS 10, LINUX 2.6) pathname translation may sometimes be performed within the operating system kernel by traversing backwards a directory name lookup cache (DNLC). Using such translation systems in the data replication environment, however, may yield concurrency issues if certain locking processes are not performed. For instance, in order to ensure that other threads or processes do not rename one of the components of a file's absolute path between the time that the thread computes the absolute path and the time that a relevant log entry is emitted, the DNLC would need to be locked against updates from other threads during that period of time. Having this central lock on the DNLC, however, may impose severe performance penalties on the entire operating system.

Figure 9:
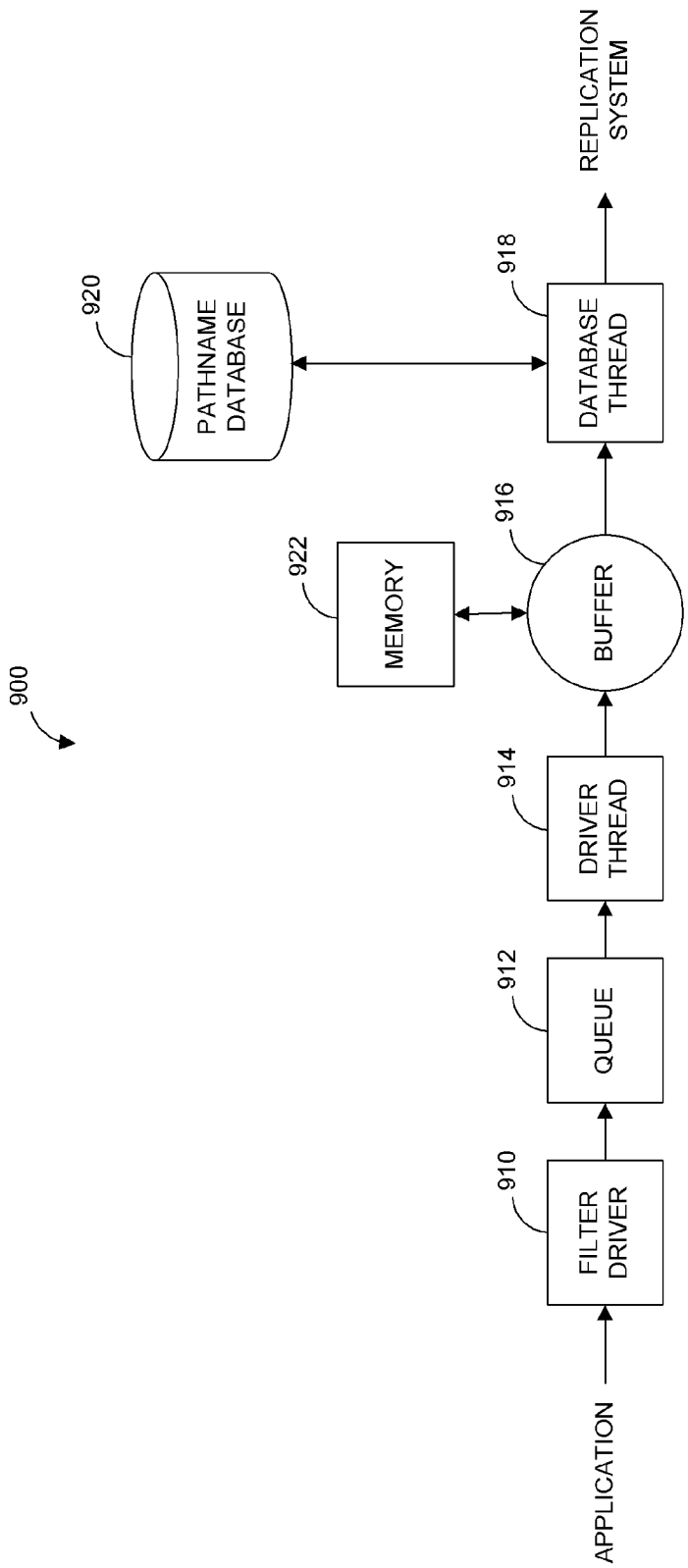
FIG. 9 illustrates a block diagram of an exemplary embodiment of a pathname translation system usable with embodiments of a data replication system.

FIG. 9 illustrates a block diagram of an exemplary embodiment of a data path 900 usable to generate journal entries. Portions of the data path 900 can be configured to more efficiently perform pathname translation in a data replication system. For example, in certain embodiments, the data path 900 is advantageously configured to convert inode numbers (such as those used inside the kernel driver and/or associated virtual file system handlers) of a source system into absolute file pathnames to be used on one or more replication systems. In certain embodiments, all or a portion of the pathname translation is advantageously implemented in the application space external to the kernel space (e.g., in "userland"), thereby reducing potential loads on the source system.

As shown, the data path 900 comprises a filter driver 910. In certain embodiments, the filter driver 910 is configured to monitor data management operations, such as data write operations or file attribute modification operations, associated with a computer application executing on a source computer. For instance, such operations may comprise changes to data in a production level memory. Examples of embodiments of filter drivers usable with the data path 900 are described in more detail herein.

The filter driver 910 is further configured to populate a queue 912 with log entries, or "raw" journal entries, related to detected data modification operations from the application. In certain embodiments, the log entries generated by the filter driver 910 are each associated with an inode that identifies to which directory and/or file on the source storage device the associated data modification was directed. The queue 912 is configured to store the log entries until they are processed by a driver thread (or process) 914. In certain embodiments, the queue 912 is implemented in volatile memory on the source system.

The queue 912 forwards the log entries to the driver thread 914. In certain embodiments, the driver thread 914 polls the queue 912 for newly-generated log entries by the filter 910. The driver thread 914 subsequently stores the log entries in a buffer 916. In certain embodiments, the buffer 916 may be labeled a "raw" buffer in that it is configured to store "raw" log entries, which were generated by the filter driver 910 and/or which do not yet have an absolute file pathname.

In certain embodiments, the buffer 916 is a memory-based queue for storing the log entries until processed by a database thread (or process) 918. In certain embodiments, the buffer 916 advantageously facilitates and/or expedites the unloading of raw records from expensive driver memory to swappable application memory. For instance, the buffer 916 may comprise an application level-buffer of a size between approximately 40 megabytes and approximately 60 megabytes. In certain embodiments, the buffer 916 is advantageously implemented as a first-in first-out buffer.

In certain embodiments, the database thread 918 is advantageously capable of performing inode-to-pathname translation for each of the log entries in the buffer 916. After performing the translation, the database thread 918 may send the log entry (with the absolute file pathname instead of the inode entry) to a desired destination, such as a replication system, for further processing.

In certain embodiments, the database thread 918 is configured to access a pathname database 920 to enable the thread 918 to perform pathname translation. The pathname database 920 advantageously stores information that associates one or more inodes or short names with an absolute file pathname. In yet other embodiments, the pathname database 920 may comprise other means or data for performing pathname translation, including, but not limited to, a flat table, customized code, combinations of the same or the like.

In certain embodiments of the invention, accessing the pathname database 920 introduces delay into the data path 900. For example, at certain points in the replication process, the filter driver 910 may generate log entries at a quicker pace than the pathname translations being performed by the database thread 918. For instance, high activity disk lookups in the database 920 for each log entry may require more time than the generation of the log entries by the filter driver 910.

In such embodiments, the buffer 916 is advantageously capable of adapting itself to the speed of the database thread 918. For example, when the lookups by the database thread 918 are relatively fast, the buffer 916 does not introduce significant delay into the data flow (e.g., relatively no performance degradation due to the buffer 916). Thus, the buffer 916 may be advantageously sized to be relatively transparent to the data stream (e.g., has a small footprint). However, when the database lookups begin to slow down, the buffer 916 is able to store multiple log entries until the database thread 918 is able to catch up.

Other mechanisms may be used to prevent user applications from over-running the data path components (e.g., the queue 912, the buffer 916, etc.). For example, in some cases user processes can generate input/output so fast that such components overflow and starts swapping. In such a case, the filter driver 910 (or other appropriate component, such as the driver thread 914) may throttle the input/output by introducing small delays into the input/output path. For example, the filter driver 910 may lengthen the delays when an in-memory queue maintained by the filter driver 910 approaches a preconfigured limit. Where the input/output throttling does not remedy the situation, and overflow still occurs, the system may abort and reinitialize the replication process.

In certain embodiments, the database lookups by the database thread 918 may become so time intensive that the maximum storage capacity of the buffer 916 is reached. In such embodiments, the buffer 916 is configured to provide disk swapping functionality to avoid overflow of the buffer 916, which may result in memory problems and/or aborting replication. For instance, as shown in FIG. 9, the buffer 916 may store excess log entries in a folder in memory 922. In certain embodiments, the memory 922 may comprise a disk and/or may be located on the storage device of the source machine.

Figure 10:
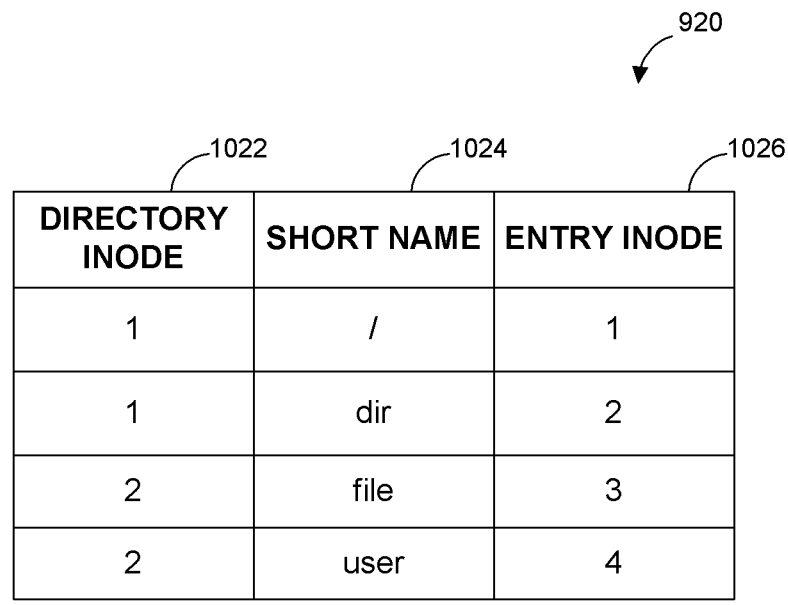
FIG. 10 illustrates an exemplary embodiment of a pathname translation database usable with embodiments of the pathname translation system of FIG. 9.

FIG. 10 illustrates an embodiment of a pathname database 920 of the data path 900 of FIG. 9. In particular, the pathname database 920 may be advantageously accessed by the database thread 918 when determining an absolute file pathname for one or more log entries.

The illustrated pathname database 920 is configured for inode-to-pathname translation, such as for a UNIX-based system. In particular, the pathname database 920 includes three columns: a directory inode (or parent inode) column 1022, a short name column 1024 and an entry inode column 1026. In yet other embodiments, as described in more detail below, the inode information in the database 920 can be replaced with FIDs.

In certain embodiments, each inode in a UNIX-based system is recorded as an entry in the pathname database 920. For instance, FIG. 10 illustrates a system having four inodes, each having a single entry in the entry inode column 1026 and having a value of "1" through "4." The corresponding short name column 1024 identifies the short name of the file or folder associated with the particular inode. For instance, entry inode "4" identifies a folder or file with the short name of "user," while entry inode "1" identifies a root directory. The directory inode column 1022, or parent inode column, identifies the inode of the parent directory to the particular entry inode. For instance, entry inode "3," which has a short name of "file," is a child of the folder with an inode of "2."

As can be seen from the illustrated pathname database 920, when the database thread 918 receives a log entry with a particular inode, the database thread 918 is able to access the pathname database 920 and construct an absolute file pathname using the information stored therein for transmission to the destination system.

Figure 11:
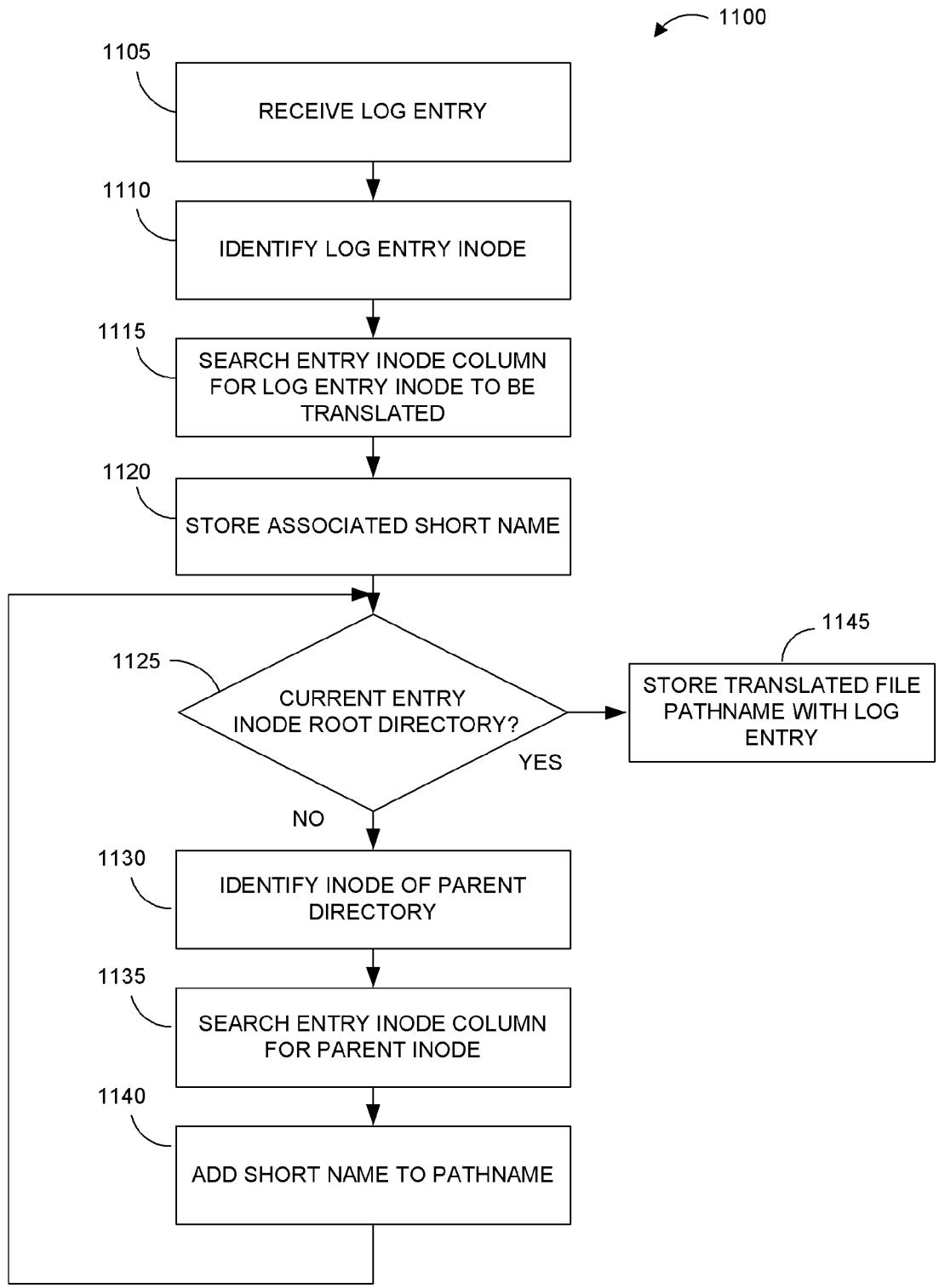
FIG. 11 illustrates a flowchart of an exemplary embodiment of a pathname translation process executable by the pathname translation system of FIG. 9.

FIG. 11 illustrates an embodiment of a simplified pathname translation process 1100, such as may be performed by the database thread 918 of FIG. 11 in conjunction with the pathname database 920 of FIG. 10. For example, the pathname translation process 1100 may be used to translate an inode to a pathname, such as an absolute file pathname to be used by a destination system in replicating data.

As shown, the translation process 1100 begins at Block 1105, wherein the database thread 918 receives a log entry to be processed. For example, with reference to FIG. 9, the database thread 918 may retrieve the log entry from a buffer 916. In certain embodiments, the log entry preferably represents a data modification operation associated with a particular application on the source system.

At Block 1110, the database thread 918 identifies the inode associated with the particular operation represented by the log entry. For instance, the inode may represent a file or folder to which data is to be written. In other embodiments, the inode in the log entry may identify a file name to be modified or other data or file modification operation.

At Block 1115, the database thread 918 accesses the pathname database 920 to acquire information for translating the inode to an absolute file pathname. In particular, the database thread 918 searches the entry inode column 1026 for an entry that corresponds to the value of the log entry inode. Once the corresponding inode entry is found, the database thread 918 determines (and stores) the associated short name from the short name column 1024 (Block 1120).

The translation process then proceeds with Block 1125. If the subject inode does not correspond to the root directory ("/"), the database thread 918 identifies from the directory inode 1022 the inode of the parent directory (Block 1130). The database thread 918 then searches the entry inode column 1026 for the parent directory inode (Block 1135) and adds the short name associated with the parent directory inode to the absolute file pathname (Block 1140).

The translation process 1100 then returns to Block 1125 to repeat the lookups and construction of the absolute file pathname until the database thread 918 reaches the root directory. Once the database thread 918 reaches the root directory, the database thread 918 stores the fully translated file pathname with the associated log entry (Block 1145), and the translation process 1100 terminates.

For exemplary purposes, the translation process 1100 will be now be described with reference to a data write command "vop_write (4, DATA)" and the values illustrated in the pathname database of FIG. 10. To begin the translation process, the database thread 918 receives the log entry representing the command "vop_write (4, DATA)" (Block 1105) which corresponds to writing "DATA" to inode "4" on the source system (Block 1110).

The database thread 918 then accesses the pathname database 920 and searches the entry inode column 1026 for a value of "4" (Block 1115). Upon finding "4" in the entry inode column 1026, the database thread 918 determines from the short name column 1024 that the short name corresponding to inode "4" is "user" (Block 1120).

Because inode "4" does not correspond to the root directory (Block 1125), the database thread 918 identifies from the directory inode column 1022 that the parent directory inode of inode "4" is inode "2" (Block 1130). The database thread 918 then returns to search the inode entry column 1026 for the inode value of "2" (Block 1135), determines that the short name for inode "2" is "dir," and adds "dir" to the file pathname (Block 1140).

Because inode "2" does not correspond to the root directory (Block 1125), the database thread 918 identifies from the directory inode column 1022 that the parent directory inode of inode "2" is inode "1" (Block 1130). The database thread 918 then searches the inode entry column 1026 for the inode value of "1" (Block 1135) and determines that the inode "1" corresponds to the root directory ("/") (Block 1140).

Now that the database thread 918 has encountered the root directory (Block 1125), the database thread 918 stores the translated file pathname (i.e., "/dir/user") with the subject log entry, and the translation process 1100 terminates.

It will be understood that the translation process 1100 may differ in other embodiments of the invention in order to suit the needs of the particular system(s) involved. For instance, the translation process 1100 may be used to translate particular inodes into file pathnames shorter than an absolute file pathname, such as for example a relative pathname. In yet other embodiments, the process can use FIDs in place of inodes to construct absolute file names of files on the source system.

In certain embodiments, the three-column database 920 provides significant advantages over a flat two-column table (e.g., with an inode column and an absolute file pathname column). For instance, the three-column database structure of the pathname database 920 may use less memory than the two-column table and/or expedite folder rename operations. As an example, when a name of a folder is modified, the three-column database structure allows for a single lookup and modification (e.g., modifying the short name column 1024 entry associated with the entry inode column 1026 entry of the subject inode), while the two-column table would require multiple lookups and modifications corresponding to each entry having an absolute file pathname that includes the folder to be renamed.

As discussed above, in certain embodiments, the pathname database 920 is maintained in userland (e.g., an application space external to the kernel space). In such embodiments, the pathname database 920 may be advantageously managed and/or accessed by userland code without impacting the resources of the operating system kernel or other applications.

In certain embodiments, the pathname database 920 may be initially populated during an initialization period. For instance, a snapshot may be taken to produce a static image of the file system of the source system. The pathname database 920 may then be populated based on the snapshot. As subsequent changes are made to file names of the source system, corresponding changes are made in the pathname database 920 in order to maintain synchronization. In yet other embodiments, as discussed in more detail below, the pathname database 920 can be populated based on scan of a live source file system.

In yet other embodiments, the pathname database 920 may be specific to the files and/or folders of one or more particular applications. For example, the pathname database 920 may include inodes, short names and related information only for those inodes affected by a single application (e.g., MICROSOFT EXCHANGE). In yet other embodiments, multiple pathname databases 920 may be used.

As can be appreciated in the translation systems and methods described with reference to FIGS. 9-11, it can be important for the file system on the destination system to be in a synchronized state with the pathname database 920; otherwise the replication system can encounter a file system error (e.g., a file directory does not exist) when attempting to apply a journal entry on the destination system. In certain embodiments, this error can result in replication failure and require a resynchronization of the both the source and destination systems via the initial seeding or synchronization process discussed above.

Moreover, as discussed, certain embodiments of the initial synchronization process include performing an initial file system scan and populating the pathname database 920. As mentioned, this can be performed by scanning a file system snapshot of the source system, which obtains a static image of the file system. In particular, the replication system can take a consistent snapshot in which, for the duration of the snapshot (e.g., the file system is flushed, frozen, and snapped by file system driver), no namespace changing operations are allowed, such as renames of a directory, deletes, and/or creates. If the replication system detects that some of these operations have occurred during the synchronization process, the replication system may need to delete the snapshot and re-perform the scan. In certain circumstances, especially in active file systems, the replication system can get trapped in a virtually infinite loop trying to take the snapshot over and over again due to the constantly changing files.

In yet other embodiments, the source file system may not support the taking of consistent snapshots or may require additional drivers to be installed, thereby complicating the snapshot process. Moreover, taking snapshots of a root file system can introduce even further complications. For example, in some cases a root file system is allocated on a file system on which a snapshot cannot be taken, or on which it is difficult to take a snapshot. For instance, in Linux based systems the root file system is often located on a separate partition, outside of the Linux Volume Manager (LVM). Moreover, system directories (e.g., /etc., /var/tmp, /tmp) are often not sub-divided and are therefore all located on the same root file system. In such cases, it can be difficult to take a snapshot because modifications to these directories occur on an on-going, continual basis.

Thus, certain embodiments of the invention provide systems and methods for producing a consistent image of a live source file system in a pathname, or file name, translation database and/or on a destination system without requiring a static image of the file system. Such embodiments can advantageously allow for changes to the source file system to occur while other portions of the file system are being scanned, thereby expediting the initial seeding of the file name database and/or destination system and replaying of intercepted data changes on the replication system.

For example, certain embodiments of the invention in a UNIX environment utilize FIDs for performing snapless synchronization and replication in a CDR system. In certain embodiments, each FID comprises a sequence of between eight and sixteen bytes that uniquely identifies a file or folder in a file system.

In certain embodiments, the FIDs are introduced part of a UNIX kernel for supporting stateless implementation of Network File System (NFS) version 3 or below. For example, the NFS 3 file system can access files and directories via handles, in which the file system encodes all relevant information that it needs to later translate the FID to the corresponding file or directory inode.

In certain embodiments, NFS does not interpret contents of handles, but it uses the contents to directly refer to the files and directories of interest. For instance, these handles can contain FIDs, file/directory inode numbers, generation numbers or the like. Moreover, file systems that are NFS-compatible (i.e., can be exported via NFS) can support the use of FID scanning, as discussed in more detail below.

The use of FIDs can provide several advantages both during scanning and during replication, such as for improving writes to the destination system. For instance, systems can address subdirectories and carry on with scanning even while the user makes changes to the file system, including such changes as renaming parent folders. Moreover, because the file system translates FID information to locate files on a storage device (e.g., mapping of FIDs to vnodes), the FIDs can be used to identify and access files or folders that are renamed or moved in a file system.

Another advantage is that generation IDs that are encoded into FIDs give additional robustness. For instance, if a file or directory is deleted and then recreated elsewhere during scanning, the file system may reuse an inode number. However, file systems using FIDs generally increment the generation ID portion of the FID with each new file system object, thereby resulting in an absolute unique FID. Thus, FIDs are unique both in space and in time, and using them can reduce the chance of accidentally confusing an old file system object with a recreated one.

Figure 12:
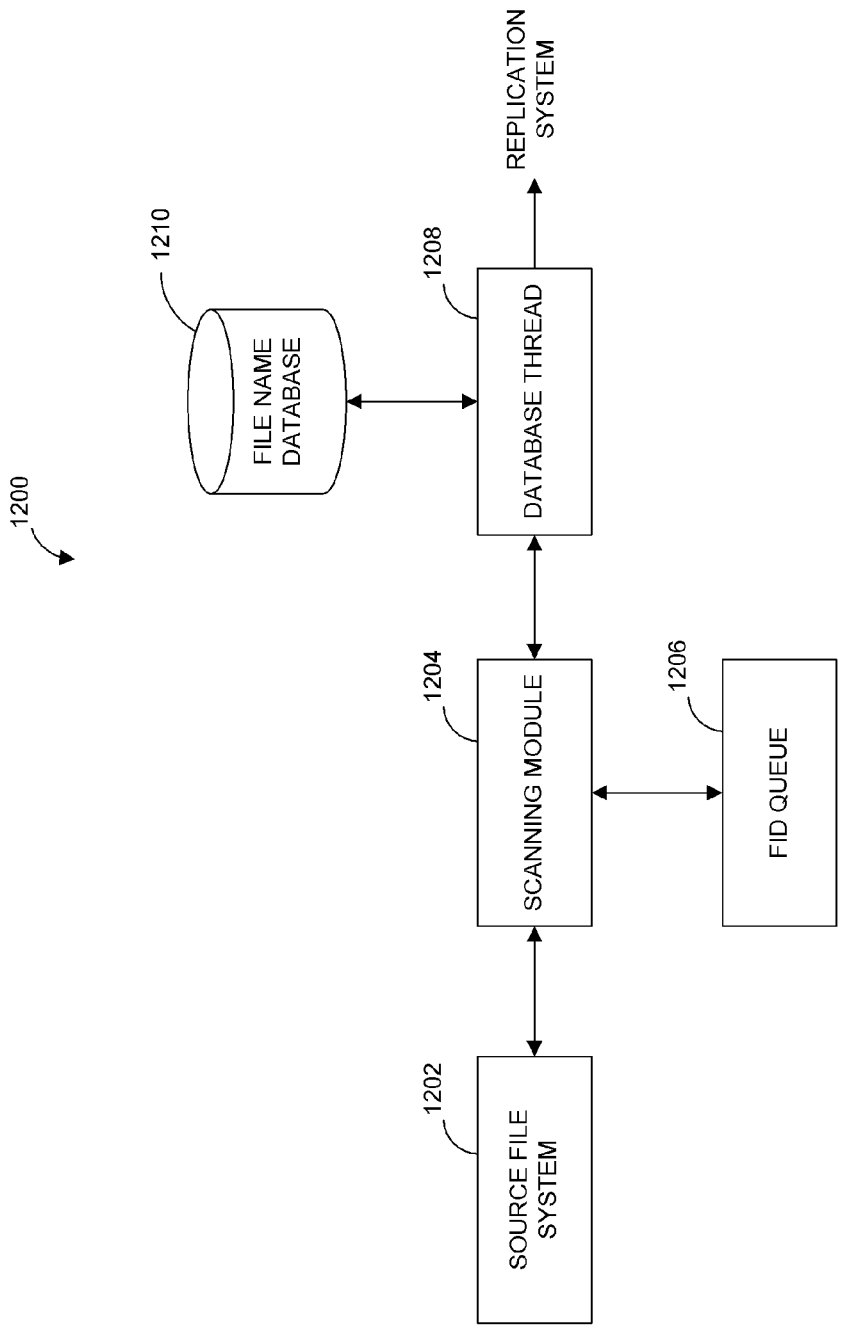
FIG. 12 illustrates a block diagram of another embodiment of a pathname or file name translation system usable with embodiments of a data replication system.

FIG. 12 illustrates a block diagram of another embodiment of a pathname or file name translation system 1200 that is configured to more efficiently perform file name translation in a data replication system. For example, in certain embodiments, the translation system 1200 is advantageously configured to associate FIDs, which are generally used primarily inside the kernel, with file short names and store the associations in a database. The system 1200 can be further configured to convert FIDs referencing files on a source system into absolute file names to be used on one or more replication systems. This translation can be advantageously implemented in the application space external to the kernel space (e.g., userland), thereby reducing potential loads on the source system.

As shown, the system 1200 includes the file system 1202 of the source computing system. In certain embodiments, the file system 1202 comprises a UNIX environment implementing NFS. In other embodiments, the file system 1202 can comprise a NFS-compatible file system.

In communication with the file system 1202 is a scanning module 1204. In certain embodiments, the scanning module 1204 is configured to scan a live file system (e.g., file system 1202), to build a database of FIDs and associated short names that reflect the structure of the file system 1202, such as during an initial seeding or synchronization phase of data replication. For instance, the scanning module 1204 can advantageously populate the database without performing a snapshot of the source file system 1202.

In certain embodiments, the scanning module 1204 can comprise one or more filter drivers, such as file system drivers that execute on a computing device, such as the source computing device. In certain embodiments, the scanning module 1204 can comprise one or more data agents 236. In yet other embodiments, the scanning module 1204 can comprise a plurality of modules, either in software or hardware, that are configured to perform the functions described herein.

In particular, the scanning module 1204 maintains a FID queue 1206 to assist with producing a consistent image of the live source file system 1202. For instance, the FID queue 1206 can store a plurality of FIDs processed by the scanning module 1204 to populate a database. In certain embodiments, the queue 1206 comprises a first in-first out (FIFO) buffer or other like memory.

The system 1200 further comprises a database thread 1208 configured to translate FIDs to absolute file names for replaying operations (e.g., as stored in a replication log file) on a destination system. For example, after performing the file name translation, the database thread 1208 may send a log entry (with the absolute file name instead of the FID) to a desired destination, such as a replication system, for further processing.

In certain embodiments, the database thread 1208 is configured to access a file name database 1210 to enable the thread 1208 to perform file name translation. The file name database 1210 advantageously stores information that associates one or more FIDs with short names and directory information. For instance, the file name database 1210 can be similar to the pathname database 920 illustrated in FIGS. 9 and 10, with inode information of the pathname database 920 being replaced with FID information. In yet other embodiments, the file name database 1210 may comprise other means or data for performing file name translation, including, but not limited to, a flat table, customized code, combinations of the same or the like.

Figure 13:
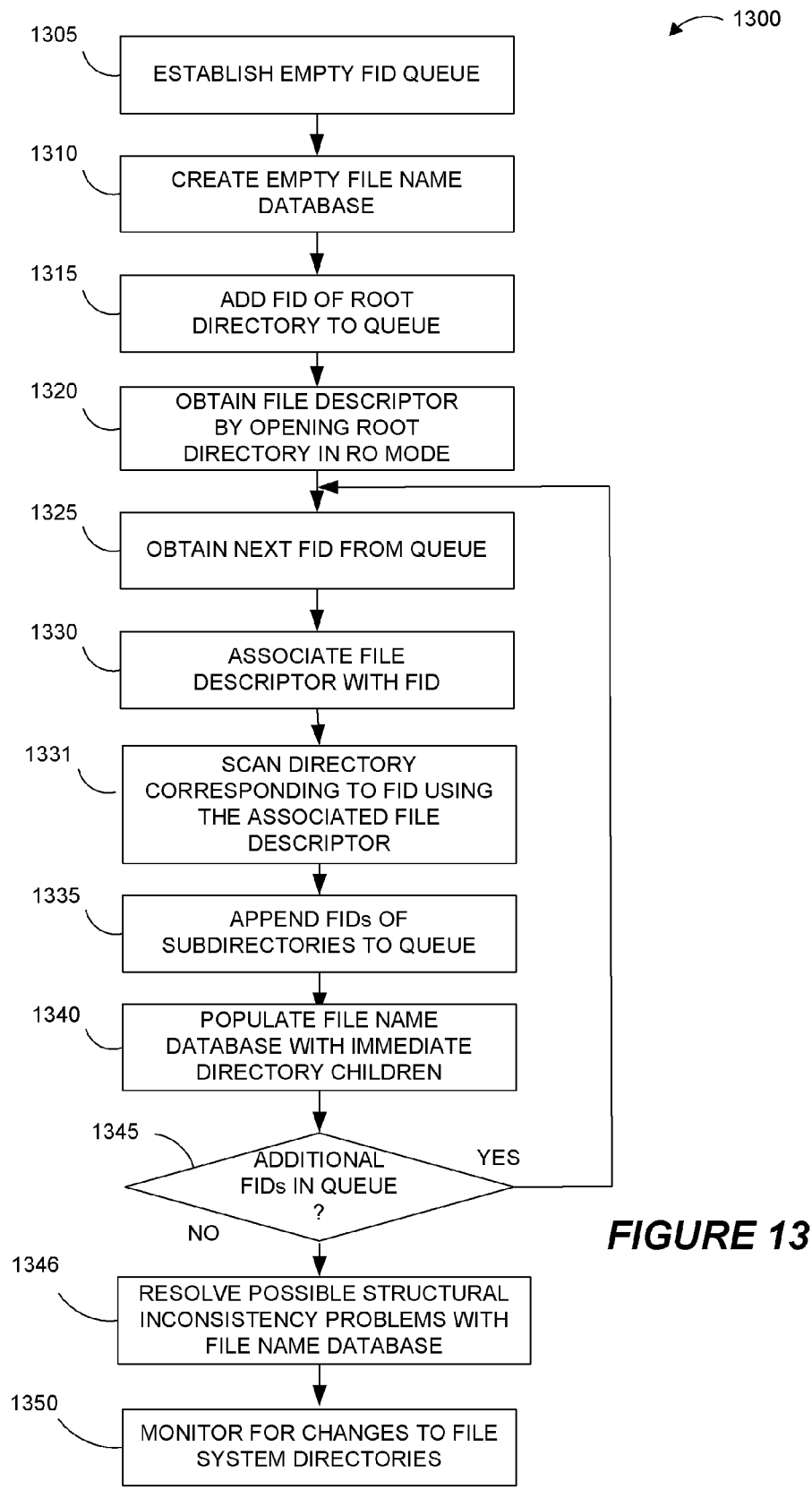
FIG. 13 illustrates a flowchart of a process for scanning a live file system, according to certain embodiments of the invention.

FIG. 13 illustrates a flowchart of an exemplary embodiment of a process 1300 for scanning a live file system. In particular, the process 1300 can be advantageously used to scan a source file system in a replication environment, such as a CDR environment, without performing a snapshot on the source file system. Such file system scanning can be less sensitive to user changes during the scan and is able to interleave journal entries generated after the scan with a file name database (e.g., database 1210) populated as part of the scan.

For example, the process 1300 may be performed on the file system 234 of the source system 102 of FIG. 2. For exemplary purposes, the process 1300 will be described with reference to the components of the file name translation system 1200 of FIG. 12.

As shown, the process 1300 begins with Block 1305 by establishing an empty queue, such as queue 1206, for holding FIDs during scanning of the file system 1202. At Block 1310, the process 1300 also creates an empty file name database 1210, as described above.

The scanning module 1204 then adds the FID of the source file system's root directory to the queue 1206 (Block 1315) and obtains a file descriptor by opening the root directory in read-only (RO) mode (Block 1320). The scanning module 1204 can obtain the file descriptor by issuing an open( ) call, for example. The file descriptor may comprise an integer or other appropriate identifier in userland, and can be used as a file handler or file identifier for input/output. Behind the scenes in the kernel, the file descriptor number can be associated with the corresponding file object. Thus, when a userland application writes some data to a file descriptor, the kernel is aware of what object the data should be written to. At this point, after obtaining the file descriptor, the process 1300 begins a recursive procedure for stepping through each of the directories in the file system 1202 and populating the database 1210 with information usable to recreate a consistent image of the file system 1202 on the destination system.

As shown, at Block 1325, the scanning module 1204 obtains the next FID from the queue 1206. In the initial pass through the process 1300, the FID will generally be the root directory FID. At Block 1330, the scanning module 1204 asks the filter driver to associate, in the kernel, the appropriate previously obtained file descriptor with the current FID. In certain embodiments, the scanning module 1204 invokes an ioctl( ) API (e.g., FLR_OPEN_BY_FID (fd, FID)) that receives both a pre-open file descriptor and an FID. In response, a file system filter driver then converts the FID to a file system vnode via a file-system-provided API and inserts the obtained vnode into the handler or file structure corresponding to the passed file descriptor. Once this has completed, the application can then access the file or directory by making usual system calls and passing them the modified file descriptor.

At Block 1331, the scanning module 1204 scans the directory corresponding to the FID using the associated file descriptor. For example, the scanning module 1204 steps into the directory associated with the current FID, such as through invoking the fchdir(fd) command, and reads each of the direct directory children, such as through the opendir(".") and readdir( ) commands. At Block 1335, for each detected subdirectory, the scanning module 1204 appends the FID associated with the subdirectory to the end of the queue 1206 for further analysis.

At Block 1340, for each of the immediate directory children, the scanning module 1204 also populates the file name database 1210 with the FID and relative (short) name information. For instance, the scanning module 1204 may insert a row in the database 1210 that includes a parent directory FID, a short name of the file or folder and the entry's FID (see, e.g., FIG. 10).

Moving to Block 1345, the scanning module 1204 determines if there are additional FIDs stored in the queue 1206. If so, the scanning module 1204 returns to Block 1325 to obtain the next FID from the queue 1206 and to step through the immediate children of the directory associated with that FID. In certain situations, with the continuously changing file system and the possibility that the same directory is scanned more than once, the scanning module 1204 can further resolve possible structural inconsistency problems between the scan list of direct children and the contents of the file name database 1210 (Block 1346). This technique is described in further detail below (e.g., with respect to the process 1400 of FIG. 14).

When there are no additional FIDs stored in the queue 1206, the process 1300 concludes and monitors log or journal entries for any changes to the source file system directories (Block 1350).

As can be seen, with the process 1300, the scanning module 1204 does not address directories or files by absolute file names. Rather, the scanning module 1204 scans each of the file system directories individually by addressing each directory by its unique FID, and by populating the database 1210 with the FIDs of children, along with their relative (short) names. UNIX systems typically do not allow direct userland access to file system objects using FIDs. Thus, the process 1300 generally constructs a dummy file descriptor that is initially associated with the root directory. The filter driver then locates desired file or directory objects (e.g., children files or directories) by their FID and associates those objects with the dummy file descriptor. Thus, a userland application can then, e.g., use a "read directory" operation to obtain the list of children.

One of the benefits of the snapless scanning process 1300 of FIG. 13 is that the file system 1202 can undergo changes by the user during scanning without requiring a rescan of the entire file system. However, in certain circumstances, although the user's changes are intercepted by a file system driver and are appended to a change journal for further replay, and although the scanning module 1204 is made less sensitive to user's changes by using the FID-driven scan, replication processes disclosed herein can still encounter problems in the replicating phase when trying to replay collected journal entries on the destination system and/or when performing database lookups.

For instance, in the case of snapshot-based scanning (e.g., FIGS. 9-11), the image on the destination system and the contents of the pathname database 920 are populated based on a point-in-time replica of the entire file system (i.e., the snapshot). Thus, all pending journal entries can be applied to the database 920 and/or replayed on destination system following the initial scan in the order that they were generated because, logically, the journal entries are generated after the snapshot.

However, in the case of snapless scanning (e.g., FIGS. 12 and 13), each directory is scanned at a different time and, likely, during user modifications to different portions of the file system. Thus, it becomes important to know if a particular folder or directory was scanned before or after a particular journal entry was generated. That is, if a journal entry associated with the contents of a folder is generated before the scanning of the folder, it may not be appropriate to apply the journal entry to the folder. Otherwise, there would be a risk of introducing inconsistencies into the file name database 1210, which can require the rescanning of one or more directories in order to repopulate the database 1210.

To address such risks of inconsistencies, in certain embodiments of the invention, when scanning a particular directory during an FID-driven scan, systems and methods can query the file system driver for its current journal sequence number. The sequence number is then stored in the file name database 1210 or other location along with the identification of the current directory's children. When the system is to apply a stream of journal entries to the database 1210, the system can ignore all journal entries that were generated before the subject directory was scanned, as identified by the stored journal sequence number.

Figure 14:
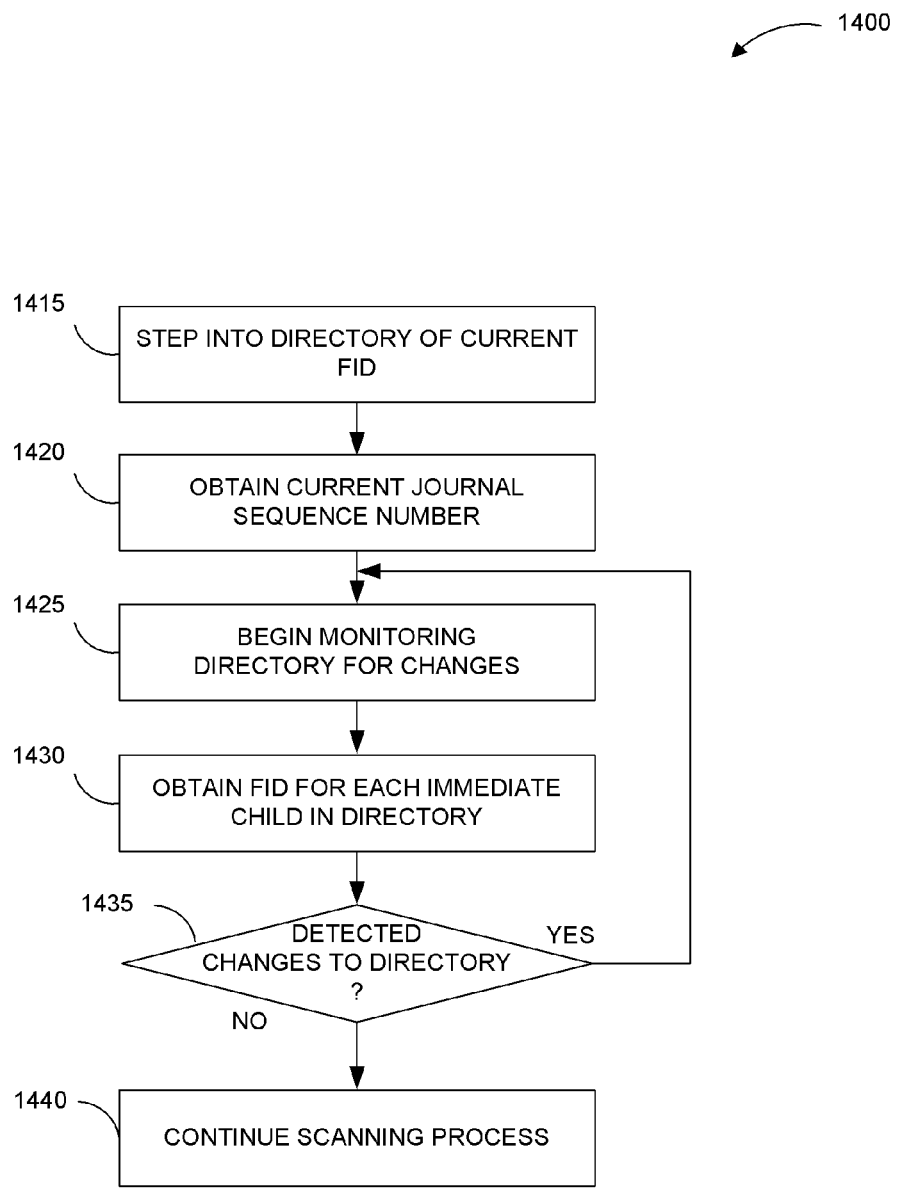
FIG. 14 illustrates a flowchart of a scan routine usable within the process of FIG. 13, according to certain embodiments of the invention.

FIG. 14 further illustrates a flowchart of an exemplary embodiment of a scan routine 1400 for obtaining both structural information from a file system (e.g., which FID represents a child of which parent directory FID) and the time at which the particular relationship was observed. In certain embodiments, this information is stored in the same database. In particular, the scan routine 1400 can be implemented as part of the scan process 1300 (e.g., at Blocks 1325 to 1340) to improve FID-driven scanning and preserve consistency between the source file system image and the file name database. For exemplary purposes, the process 1400 will be described with reference to the components of the system 1200 of FIG. 12.

The scanning module 1204 obtains the first directory FID from the queue 1206 and associates a file descriptor with the FID, such as via a ioctl( ) call (e.g., a FLR_OPEN_BY_FID (fd,FID) command). For example, these actions may be performed in the manner described above with respect to FIG. 13 (Blocks 1305 and 1310). At Block 1415, the routine 1400 steps into the directory of the current FID. For example, as discussed above, this can take place by the scanning module 1204 invoking the fchdir(fd) command.

At Block 1420, the scanning module 1204 obtains the current journal sequence number. In certain embodiments, the sequence number is assigned by a file system filter driver to each newly generated journal entry, being incremented with elementary changes made to the file system. In certain embodiments, the scanning module 1204 obtains the sequence number from the filter driver and can be used as a measure of time and to advantageously coordinate the file system scan results with the stream of journal entries generated due to user's changes to file system data.

Upon obtaining the journal sequence number, the scanning module 1204 begins monitoring the current directory for changes (Block 1425). For instance, the scanning module can invoke an ioctl( ) call that takes the FID of the current directory and initiates collecting statistics for the directory in the driver. In certain embodiments, collecting the statistics comprises utilizing a counter of namespace changing operations applicable to the current directory and intercepted by the driver.

The scanning module 1204 then obtains the FID for each immediate child in the directory (Block 1430), as discussed in more detail above with respect to Block 1335. After processing each of the immediate children in the current directory, the scanning module 1204 determines if there were any structural changes to the directory during the scan (Block 1435). For instance, the scanning module 1204 could issue an ioctl( ) call that stops the collecting of statistics (e.g., by the driver) and returns the number of namespace changing operations that happened since Block 1425.

If there were structural changes to the directory during that time, the routine 1400 assumes that the scan was not clean and repeats the scan process for the current directory by returning to Block 1425. On the other hand, if no changes are detected, the routine continues on with the file scanning process. For example, the routine proceeds to populate the file name database 1210 with the FIDs of direct children of the current directory. This can occur in the fashion described above with respect to the process 1300 of FIG. 13 (Block 1340). In certain embodiments, the process 1400 also includes storing the scan sequence number obtained at Block 1420 for the current directory. The routine in one configuration also stores the sequence number obtained at Block 1420 in the file name database 1210. For example, the stored sequence number can then be used during replication to apply collected log entries, as described below with respect to FIGS. 15A-15B.

In certain situations, with the continuously changing file system and the possibility that the same directory is scanned more than once, the scanning module 1204 can further resolve possible structural inconsistency problems between the scan list of direct children and the contents of the file name database 1210. For instance, the scanning module 1204 can request a rescan of suspicious file system objects by appending their FIDs to the queue 1206 and/or by re-parenting to "null_fid" all database children of the current directory that are not identified on the scan list.

In certain embodiments, for files that are on the scan list but are not identified in the database 1210 as children of the current directory, the routine 1400, such as through the database thread 1208, can add rows corresponding to the files in the database 1210. For subdirectories that are on the scan list but are not identified in the database 1210 as children of the current directory, the routine 1400 can determined if the database already has an entry for the subdirectory. If so, and the subdirectory is identified as a child of another directory, the database thread 1208 can re-parent the subdirectory to the current directory and request a re-scan of the previous parent by obtaining its FID and appending it to the queue 1206. Otherwise, the database thread 1208 can add a new row describing that the subdirectory is the child of the current directory and can append the FID of the subdirectory to the FID queue 1206, thereby ensuring that before the scan completed, the child subdirectory will be recursively scanned as well.

Figure 15A:
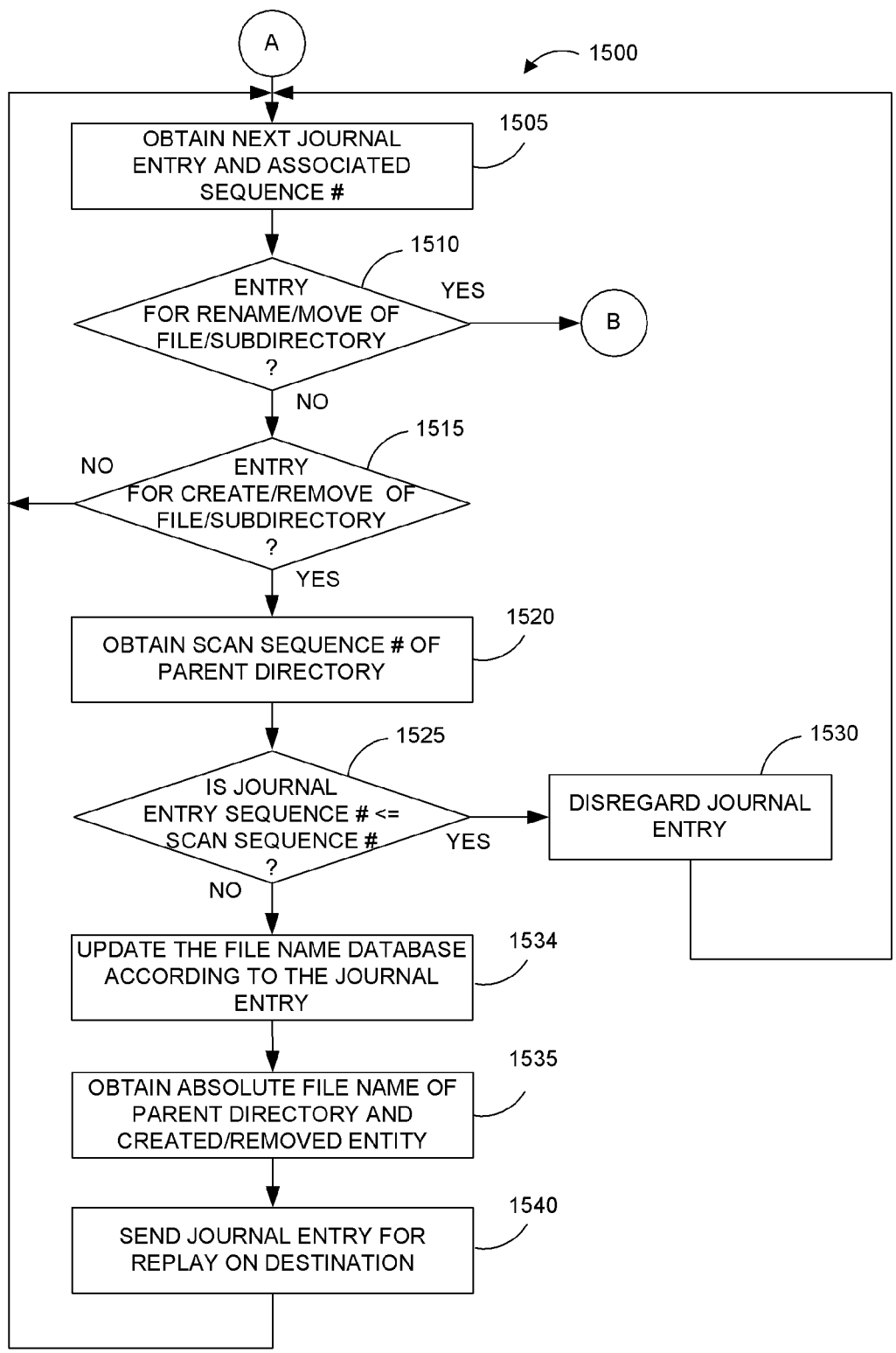
FIGS. 15A and 15B illustrate a flowchart of a replication process for interleaving a stream of journal entries with database results of a live file system scan, according to certain embodiments of the invention.
Figure 15B:
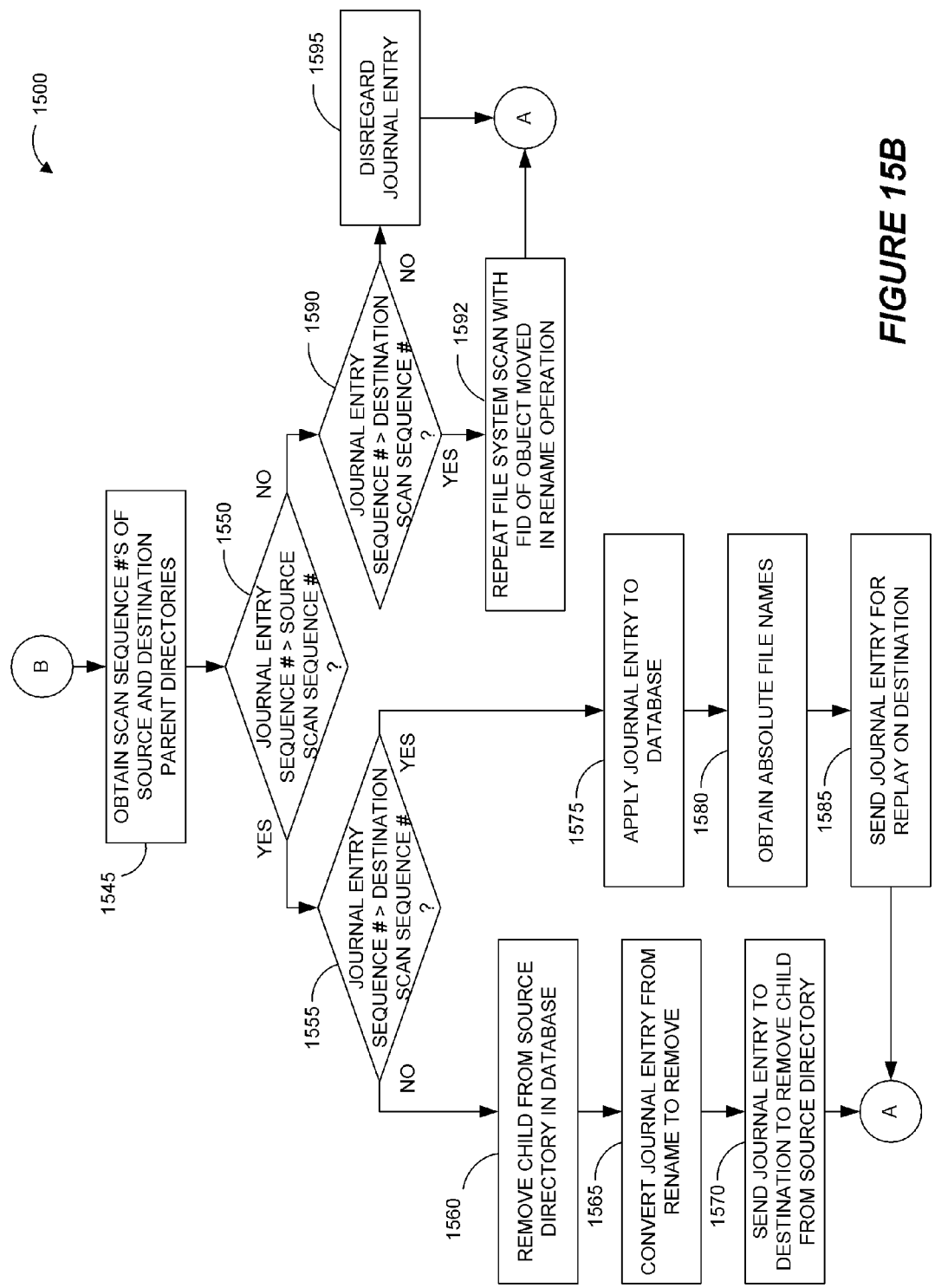

After the file name database 1210 is initially populated, certain embodiments of the invention are configured to detect file system changes on the source system and replicate such changes to the file name database 1210 and, ultimately, to the destination system. FIGS. 15A and 15B illustrate a flowchart of an exemplary replication process 1500 for interleaving a stream of journal entries with the results of the live file system scan in the database 1210, such as generated by the process 1300 and/or routine 1400. For exemplary purposes, the process 1500 will be described will be described with reference to the components of the file name translation system 1200 of FIG. 12.

In general, the process 1500 includes obtaining and comparing sequence numbers of journal entries with scan sequence numbers of respective FIDs in the database 1210. Based on this comparison, the process 1500 determines whether or not to apply the journal entry to the database 1210 and destination system, to discard the journal entry, or to trigger an additional FID scan.

The process 1500 begins at Block 1505 by obtaining the next journal entry and its associated sequence number from the file system driver, such as the filter driver 110, or a source log 244. The process 1500 determines if the current journal entry is associated with a rename (or move) operation of a file or subdirectory from one parent directory to another (Block 1510). If not, the process 1500 then determines if the current journal entry is associated with a create or remove operation of a file or subdirectory in a parent directory (Block 1515). If not, the process 1500 returns to Block 1505 to obtain the next journal entry.

If it is determined at Block 1515 that the journal entry is associated with a create or remove operation, the scanning module 1204 and/or the database thread 1208 look up the parent directory's FID in the database 1210 to obtain the FID's scan sequence number, such as discussed with respect to Block 1420 (Block 1520). If the sequence number of the journal entry is less than or equal to the FID sequence number (Block 1525), the process 1500 disregards the journal entry under the assumption that the journal entry was generated before the scanning of the corresponding portion of the file system (Block 1530). The process 1500 then returns to Block 1505 to obtain the next journal entry.

At block 1534, the process 1500 updates the database 1210 to reflect or include the obtained journal entry. If the sequence number of the journal entry is greater than the FID sequence number in the database 1210, the database thread 1208 obtains from the database 1210 the absolute file names of both the parent directory and the created/removed entity (Block 1535). With the information, the database thread 1208 sends the journal entry for replay on the destination system (Block 1540). The process 1500 then returns to Block 1515 to obtain the next journal entry.

If at Block 1510, the journal entry is associated with a rename (or move) operation of a file or subdirectory from one parent directory to another, the process 1500 moves to Block 1545 to obtain from the database 1210 the FIDs of both the source and destination parent directories. If the journal entry sequence number is greater than the sequence number associated with the scan of the source directory (Block 1550), the process 1500 then determines if the journal entry sequence number is also greater than the sequence number associated with the scan of the destination directory (Block 1555). If it is not, the database thread 1208 removes the child from the source directory in the database 1210 (Block 1560) and converts the journal entry from a rename operation to a remove operation (Block 1565). The database thread 1208 then sends the journal entry to the destination system to remove the child from the source directory (Block 1570). The process 1500 then returns to Block 1505.

If at Block 1555 the journal entry sequence number is determined to be greater than the sequence number associated with the scan of the source and destination directories, the database thread 1208 applies the journal entry to the database 1210 (Block 1575). The database thread 1208 further obtains from the database 1210 the absolute file names of the involved file system objects (Block 1580) and sends the journal entry to the destination system for replay (Block 1585). The process 1500 then returns to Block 1505.

If at Block 1550 it is determined that the journal entry sequence number is less than or equal to the sequence number associated with the scan of the source directory, the process 1500 further determines if the journal entry sequence number is greater than the sequence number associated with the scan of the destination directory (Block 1590). If so, the process 1500 recognizes that the FID of the object being moved is not in the file name database 1210. That is, the source directory was scanned after the rename was detected, and the destination directory was scanned before the rename was detected, indicating that the scanning module 1204 missed the moved file system object. In this situation, the process 1500 repeats the file system scan beginning with the FID of the object moved in the rename operation (Block 1592). The process 1500 then returns to Block 1505 to obtain the next journal entry.

If at Block 1590 it is determined that that the journal entry sequence number is less than or equal to the sequence number associated with the scans of the source and destination directories, the process 1500 disregards the journal entry (i.e., occurred before scans of both source and parent directories) (Block 1595) and returns to Block 1505 to obtain the next journal entry.

In certain embodiments, the use of FIDs in file system scanning and/or causing the associated filter driver to refer to affected file system objects by FIDs can advantageously provide for more efficient handling of write operations. For instance, written data does not need to be journaled from the file system driver to userland. Rather, the FID of the modified file and the offset/length of the modified regions can be sent to the userland application for use in reading the data directly from the file by opening the file with the FID and by merging the modified byte ranges.

This process can provide several benefits. For instance, not piping written data from the driver to the userland application or journal can provide significant improvements in performance. That is, copying data first in the driver's memory, then passing the data to the userland application and storing the data in the disk cache can be quite expensive. By not journaling the actual data, but obtaining the data when needed directly from disk, system performance can be improved several times.

In yet other embodiments, the use of FIDs in combination with a slight delay in the actual transfer of data to the destination system can allow replication systems to accumulate a list of changed byte ranges in memory. This can provide further advantages in that the replication system can analyze the changed bytes and optimize and/or improve replication of data to the destination system.

For example, in certain embodiments, inventive systems and methods can combine multiple write operations into a single write operation based on the FIDs and byte ranges associated with operations by one or more applications. For example, the journal entry stream identifying the data operations intended for the source file system can be modified to refer to FIDs instead of inode numbers and to journal the offset and/or length of overwritten byte ranges instead of actual data. This allows systems and methods to obtain written data directly from disk, thereby achieving a significant improvement in performance.

For instance, in certain embodiments, the file system filter driver and/or data agent(s) monitoring data operations can write repetitive writes to a single location. In yet other embodiments, the file system driver can combine modified adjacent byte ranges into a single write operation. In further embodiments, the file system driver can read non-combinable byte ranges in the order of increasing file offsets, thereby obtaining better performance from the file system and during subsequent replication.

In certain embodiments, the file system driver and/or data agent(s) can improve replication with respect to temporary files. The phrases "temporary file" or "temporary data" are broad terms and are used herein in their ordinary sense and include, without limitation, data that is created by a program or application (e.g., editors and compilers) for some transitory purpose, but deleted later, generally within a short period of time.

For instance, in conventional replication systems, when an application creates a temporary file, the new contents of the temporary file are generally replicated from the source to destination system. A brief time, later the REMOVE command is replicated from the source system that deletes the transferred data on the destination system, mimicking the manner in which the file was created and removed by the application(s) on the source system.

By introducing the slight delay in the replication process, such a by accumulated a number of journal entries, inventive systems and methods may encounter an error (e.g., a "no such file or directory" or "file not found" error) from the file system when attempting to read the contents of a temporary file when, within the delay period, the temporary data has been removed from the source system. As a result, the replication system does not send the temporary data across to the destination system, as the file system is not able to locate the deleted file by the FID.

Figure 16:
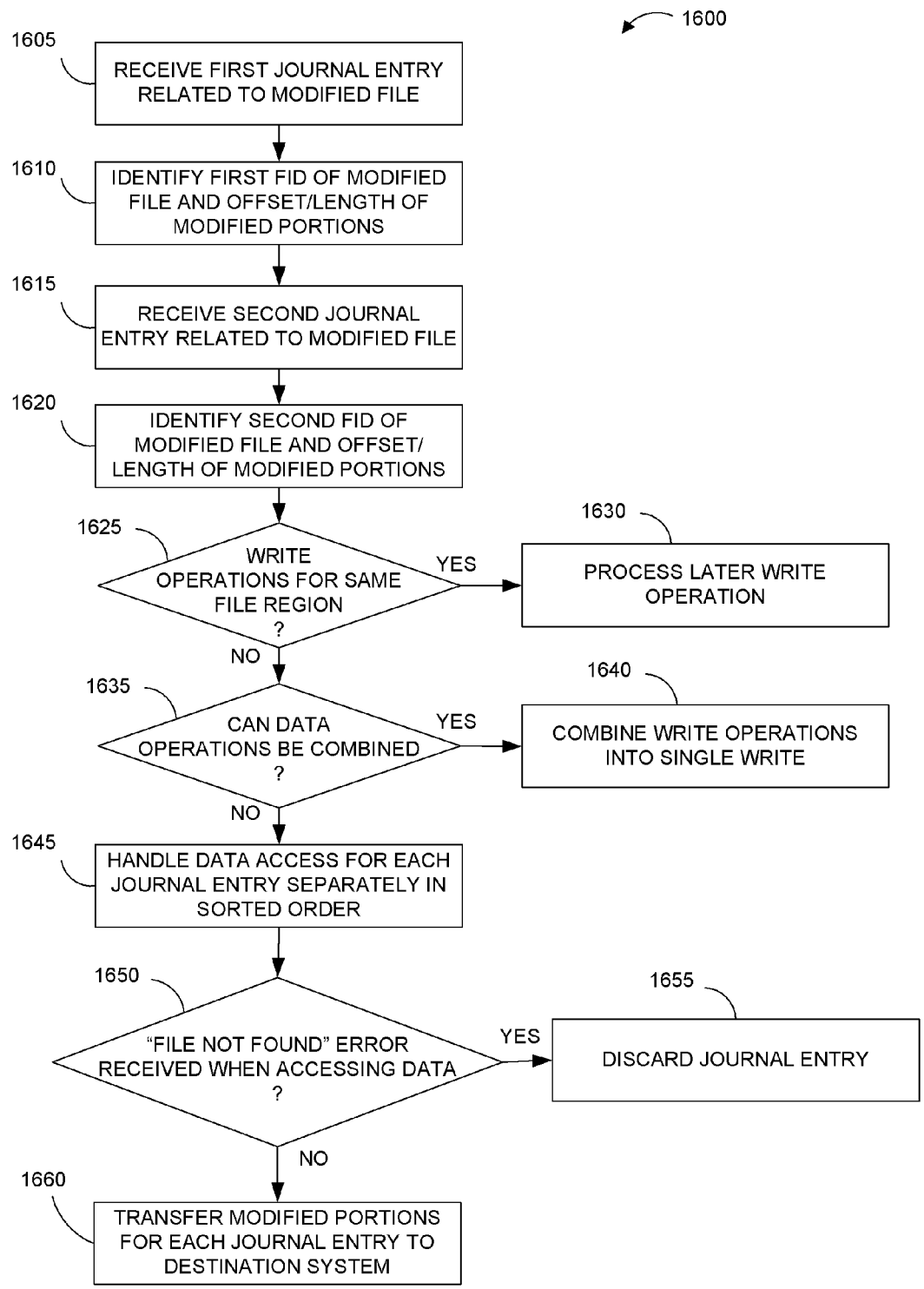
FIG. 16 illustrates a flowchart of another replication process usable with embodiments of a data replication system.

FIG. 16 illustrates a flowchart of an exemplary process 1600 including a delay period as discussed above for improving continuous data replication. In particular, the process 1600 addresses the analysis of multiple (e.g., two) data operations received from one or more applications during an introduced delay period; however, it will be appreciated that other embodiments of the invention can introduce longer delays that capture additional data operations for analysis. For exemplary purposes, the process 1600 will be described with reference to the components of the replication system 400 of FIG. 4 utilizing an FID-driven replication procedure.

As shown at Block 1605, the process 1600 begins by receiving from the filter driver 110 a first journal entry related to a modified file. In certain embodiments, the file system filter driver 110 intercepts or otherwise accesses a data modification operation sent by the application(s) 108. At Block 1610, the data agent 236 identifies the FID of the file to be modified on the source system 102 and the offset and length of the modified portions of the file. In certain embodiments, the filter driver 110 advantageously does not store or otherwise retain a copy of the actual data to be modified for each such data modification operation.

Also, instead of immediately transmitting to the destination system 104 the logs and data associated with replaying the data operation on the destination system 104, the process 1600 introduces a delay in the replication of data. In certain embodiments, this delay is between approximately three and four seconds, in other embodiments, the delay can be of a shorter or longer duration.

Due to the delay, the data agent 236 receives at least a second journal entry before the data associated with the first journal entry is accessed (Block 1615). At Block 1620, based on the second journal entry, the data agent 236 identifies the FID of the file to be modified on the source system 102 and the offset and length of the modified portions of the file. Based on the data location information received from both the first and second journal entries, the data agent 236 determines if the data modification operations from the two journal entries are write operations for the same data (Block 1625). If so, the filter driver 110 processes only the later data write operation associated with the second journal entry and accesses the modified data portions on disk for transmission to the destination system (Block 1630). The earlier data operation of the first journal entry is ignored as being out-of-date.

However, if the data operations are for different file regions, the data agent 236 determines if the operations concern writes to adjacent byte ranges that can be combined (Block 1635). For example, the data agent 236 can determine if the distance between the two byte ranges is larger than a predetermined threshold. For instance, the threshold can be based on the size of overhead (e.g., a header) associated with journal entries. In certain embodiments, the threshold distance is 200 bytes. In yet other embodiments, the distance can be larger (e.g., 1 KB) or shorter and/or dynamically adjusted.

If the distance between the two byte ranges is less than the threshold, the process 1600 combines the separate write operations of the first and second journal entries into a single journal entry having a single write. In this case, the single write operation is replayed on the destination system 104 with both byte ranges being replicated (Block 1640).

If the byte ranges are sufficiently separated, the data operations from the two journal entries cannot be combined, and the process 1600 handles the journal entries separately (Block 1645). That is, the data agent 236 accesses each of the modified portions of the file(s) based on the information in the two journal entries. If either of the data access requests results in a particular type of file system error, such as a "no such file or directory" or "file not found" error (Block 1650), the process 1600 discards the journal entry associated with the request (Block 1655). For instance, in certain embodiments, due to the introduced delay, by the time the data is requested, the data may have already been deleted, moved or removed, such as is the case with temporary files.

Finally, if no error is received when trying to access the data, the process 1600 transfers the modified portions pertaining to each journal entry for replay and replication on the replication system 104. In certain embodiments, the transfer and/or replay of the journal entries can be performed in order of increasing file offsets, especially with journal entries associated with the same FID.

Although the process 1600 is described with reference to particular arrangements, it will be understood that other embodiments of the invention may have more or fewer blocks that those described above. For instance, the data location information extracted from the second journal entry can be further compared with data location information of a third journal entry or additional journal entries, Thus, as can be seen, the process 1600 can be repeated for each subsequent journal entry captured by the filter driver 110.

Embodiments of the invention have been described herein with reference to UNIX file systems and can include LINUX, XFS, Veritas, EXT3 file systems and the like.

In certain embodiments of the invention, data replication systems and methods may be used in a modular storage management system, embodiments of which are described in more detail in U.S. Pat. No. 7,035,880, issued Apr. 5, 2006, which is hereby incorporated herein by reference in its entirety. For example, the data replication system may be part of a storage operation cell that includes combinations of hardware and software components directed to performing storage operations on electronic data. Exemplary storage operation cells usable with embodiments of the invention include CommCells as embodied in the QNet storage management system and the QiNetix storage management system by CommVault Systems, Inc. (Oceanport, N.J.), and as further described in U.S. Pat. No. 7,454,569, issued Nov. 18, 2008, which is hereby incorporated herein by reference in its entirety.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments of the invention are also described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flowchart and/or block diagram block or blocks.

In addition, methods and functions described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or block.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for identifying data to be copied in a data replication system, the method comprising:
    obtaining with a scanning module executing on a computing device a first file identifier descriptor (FID) of a first directory on a live source file system, the first FID being one of a plurality of unique identifiers corresponding to a plurality of directories and files on the source file system;
    adding the first FID to a queue;
    storing a current journal sequence number from a file system filter driver identifying a first time;
    following said storing, accessing a current directory of the plurality of directories on the source file system that corresponds to a next FID stored in the queue;
    obtaining additional FIDs for each immediate child directory and immediate child file in the current directory;
    if no changes have been made to the current directory since the first time,
        populating a file name database with the additional FIDs of each immediate child directory and immediate child file in the current directory,
        adding the additional FIDs of each immediate child directory of the current directory to the queue, and removing the next FID from the queue; and
    if changes have been made to the first directory since the first time, repeating said storing, said accessing and said obtaining the additional FIDs.

2. The method of claim 1, wherein said obtaining the first FID is performed without performing a snapshot on the source file system.

3. The method of claim 1, wherein the first directory is the current directory.

4. The method of claim 1, additionally comprising repeating said storing, said accessing and said obtaining the additional FIDs for each FID stored in the queue.

5. The method of claim 1, wherein said populating the file name database comprises for each immediate child directory and immediate child file in the current directory and storing in the file name database:
    the additional FID for the immediate child directory or immediate child file;
    a corresponding short name for the immediate child directory or immediate child file; and
    the next FID as a parent directory of the immediate child directory or immediate child file.

6. The method of claim 1, wherein said changes comprise namespace changes to the current directory.

7. The method of claim 1, wherein the first directory comprises a root directory of the live source file system.

8. The method of claim 1, additionally comprising monitoring at least one data management operation directed to first data stored in the source file system.

9. The method of claim 8, additionally comprising replaying the at least one data management operation on replication data stored on a destination file system.

10. The method of claim 9, additionally comprising:
    constructing, from information populated in the file name database, an absolute file name that corresponds to the location of the first data on the source file system; and
    transmitting the absolute file name to the destination system to direct said replaying of the at least one data management operation.

11. A system for preparing data for replication from a source computing device in a network, the system comprising:
    a queue configured to store a plurality of file identifier descriptors (FIDs) each comprising a unique identifier that corresponds to one of a plurality of directories and files on a source file system;
    a scanning module executing on a computing device and configured to scan the source file system while in a live state and to populate the queue with the plurality of FIDs;
    a database comprising file name data that associates each of the plurality of FIDs with a short name and a parent FID, wherein the scanning module is further configured to populate the database with the file name data based on said scan of the source file system in the live state; and
    at least one database thread configured to receive a data entry identifying a data management operation associated with at least one of the plurality of directories and files on the source file system and to construct from the FID associated with the at least one directory or file an absolute file name for transmission to a destination system along with a copy of the data management operation for replying on the destination system.

12. The system of claim 11, wherein the scanning module is further configured to:
    access a current directory of the plurality of directories on the source file system that corresponds to a next FID in the queue; and
    obtain additional FIDs for each immediate child directory and immediate child file in the current directory.

13. The system of claim 12, wherein the scanning module is further configured to:
- populate the file name database with the additional FIDs of each immediate child directory and immediate child file in the current directory, and
- add the additional FIDs of each immediate child directory of the current directory to the queue.

14. The system of claim 11, further comprising a filter driver situated between the source file system and at least one application configured to request the data management operation.

15. The system of claim 14, wherein the filter driver is further configured to assign journal sequence numbers to each journal entry associated with a requested change to the source file system.

16. The system of claim 15, wherein the scanning module is further configured to receive a current journal sequence number from the filter driver prior to accessing the current directory.

17. The system of claim 16, wherein the scanning module is configured to repeat said accessing and obtaining when changes are detected to the current directory following a time of the current journal sequence number but prior to said obtaining.

* * * * *

UNITED STATES PATENT AND TRADEMARK OFFICE
CERTIFICATE OF CORRECTION

| | |
|---|---|
| PATENT NO. | : 8,489,656 B2 |
| APPLICATION NO. | : 13/118250 |
| DATED | : July 16, 2013 |
| INVENTOR(S) | : Erofeev |

It is certified that error appears in the above-identified patent and that said Letters Patent is hereby corrected as shown below:

Title Page

In column 2 (page 5 item 56) at line 64, under Other Publications, change "Applicaiton" to --Application--.

In column 1 (page 6 item 56) at line 28, under Other Publications, change "Mangement" to --Management--.

In the Specification

In column 2 at line 59, change "replying" to --replaying--.

In column 33 at line 56, change "that that" to --that--.

In the Claims

In column 38 at line 60, in Claim 11, change "replying" to --replaying--.

Signed and Sealed this
Twenty-fourth Day of May, 2016

Michelle K. Lee
*Director of the United States Patent and Trademark Office*